US008635083B1

(12) United States Patent
Casu

(10) Patent No.: US 8,635,083 B1
(45) Date of Patent: Jan. 21, 2014

(54) SYSTEMS AND METHODS FOR FACILITATING THE ESTABLISHMENT OF PHARMACEUTICAL REBATE AGREEMENTS

(75) Inventor: Jennifer Michelle Casu, Ontario (CA)

(73) Assignee: McKesson Financial Holdings, Hamilton (BM)

( * ) Notice: Subject to any disclaimer, the term of this patent is extended or adjusted under 35 U.S.C. 154(b) by 1136 days.

(21) Appl. No.: 12/242,317

(22) Filed: Sep. 30, 2008

Related U.S. Application Data

(60) Provisional application No. 61/041,786, filed on Apr. 2, 2008.

(51) Int. Cl.
*G06Q 10/00* (2012.01)
(52) U.S. Cl.
USPC .................................................. 705/2; 705/3
(58) Field of Classification Search
USPC .............................................................. 705/2
See application file for complete search history.

(56) References Cited

U.S. PATENT DOCUMENTS

| | | |
|---|---|---|
| 4,674,041 A | 6/1987 | Lemon et al. |
| 4,723,212 A | 2/1988 | Mindrum et al. |
| 4,910,672 A | 3/1990 | Off et al. |
| 5,007,641 A | 4/1991 | Seidman |
| 5,080,364 A | 1/1992 | Seidman |
| 5,173,851 A | 12/1992 | Off et al. |
| 5,201,010 A | 4/1993 | Deaton et al. |
| 5,235,702 A | 8/1993 | Miller |
| 5,237,620 A | 8/1993 | Deaton et al. |
| 5,301,105 A | 4/1994 | Cummings |
| 5,305,196 A | 4/1994 | Deaton et al. |
| 5,327,508 A | 7/1994 | Deaton et al. |
| 5,359,509 A | 10/1994 | Little et al. |
| 5,388,165 A | 2/1995 | Deaton et al. |
| 5,430,644 A | 7/1995 | Deaton et al. |
| 5,448,471 A | 9/1995 | Deaton et al. |
| 5,544,044 A | 8/1996 | Leatherman |

(Continued)

FOREIGN PATENT DOCUMENTS

| | | |
|---|---|---|
| CA | 2482370 A1 | 3/2006 |
| EP | 1310895 A2 | 11/2002 |

(Continued)

OTHER PUBLICATIONS

Final Office Action for U.S. Appl. No. 12/242,307 mailed Mar. 11, 2011 (filed Sep. 30, 2008).

(Continued)

*Primary Examiner* — Hiep V Nguyen
(74) *Attorney, Agent, or Firm* — Sutherland Asbill & Brennan LLP

(57) ABSTRACT

Systems and methods for facilitating the establishment of pharmaceutical rebate agreements or arrangements may be provided. One or more rebate offers associated with one or more pharmaceutical products manufactured by the drug manufacturer may be received from a drug manufacturer via a network. One or more respective conditions associated with the one or more rebate offers may be established by the drug manufacturer. At least a portion of the one or more rebate offers may be electronically presented to a payer of pharmaceutical benefits. A selection of at least one of the presented rebate offers may be received from the payer via the network. The selection may initiate an enrollment of the payer for the at least one selected rebate offer.

20 Claims, 9 Drawing Sheets

(56) References Cited

U.S. PATENT DOCUMENTS

| | | |
|---|---|---|
| 5,550,734 A | 8/1996 | Tarter et al. |
| 5,588,649 A | 12/1996 | Blumberg et al. |
| 5,592,560 A | 1/1997 | Deaton et al. |
| 5,612,868 A | 3/1997 | Off et al. |
| 5,621,812 A | 4/1997 | Deaton et al. |
| 5,628,530 A | 5/1997 | Thornton |
| 5,638,457 A | 6/1997 | Deaton et al. |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,659,469 A | 8/1997 | Deaton et al. |
| 5,675,662 A | 10/1997 | Deaton et al. |
| 5,687,322 A | 11/1997 | Deaton et al. |
| 5,704,044 A | 12/1997 | Tarter et al. |
| 5,748,907 A | 5/1998 | Crane |
| 5,749,907 A | 5/1998 | Mann |
| 5,832,447 A | 11/1998 | Rieker et al. |
| 5,832,457 A | 11/1998 | O'Brien |
| 5,845,255 A | 12/1998 | Mayaud |
| 5,857,175 A | 1/1999 | Day et al. |
| 5,892,827 A | 4/1999 | Beach et al. |
| 5,892,900 A | 4/1999 | Ginter et al. |
| 5,915,007 A | 6/1999 | Klapka |
| 5,926,795 A | 7/1999 | Williams |
| 5,950,169 A | 9/1999 | Borghesi et al. |
| 5,956,736 A | 9/1999 | Hanson et al. |
| 5,963,915 A | 10/1999 | Kirsch |
| 5,970,469 A | 10/1999 | Scroggie et al. |
| 5,974,399 A | 10/1999 | Giuliani et al. |
| 5,991,750 A | 11/1999 | Watson |
| 6,006,242 A | 12/1999 | Poole et al. |
| 6,012,035 A | 1/2000 | Freeman et al. |
| 6,014,634 A | 1/2000 | Scroggie et al. |
| 6,021,392 A | 2/2000 | Lester et al. |
| 6,026,370 A | 2/2000 | Jermyn |
| 6,041,309 A | 3/2000 | Laor |
| 6,055,573 A | 4/2000 | Gardenswartz et al. |
| 6,067,069 A | 5/2000 | Krause |
| 6,067,524 A | 5/2000 | Byerly et al. |
| 6,073,104 A | 6/2000 | Field |
| 6,185,541 B1 | 2/2001 | Scroggie et al. |
| 6,195,612 B1 | 2/2001 | Pack-Harris |
| 6,202,923 B1 | 3/2001 | Boyer et al. |
| 6,205,455 B1 | 3/2001 | Umen |
| 6,208,973 B1 | 3/2001 | Boyer et al. |
| 6,224,387 B1 | 5/2001 | Jones |
| 6,240,394 B1 | 5/2001 | Uecker |
| 6,260,758 B1 | 7/2001 | Blumberg |
| 6,278,979 B1 | 8/2001 | Williams |
| 6,282,516 B1 | 8/2001 | Giuliani |
| 6,298,330 B1 | 10/2001 | Gardenswartz et al. |
| 6,304,849 B1 | 10/2001 | Uecker et al. |
| 6,307,940 B1 | 10/2001 | Yamamoto et al. |
| 6,307,958 B1 | 10/2001 | Deaton et al. |
| 6,321,210 B1 | 11/2001 | O'Brien et al. |
| 6,324,516 B1 | 11/2001 | Shults et al. |
| 6,330,546 B1 | 12/2001 | Gopinathan et al. |
| 6,334,108 B1 | 12/2001 | Deaton et al. |
| 6,341,265 B1 | 1/2002 | Provost et al. |
| 6,343,271 B1 | 1/2002 | Peterson et al. |
| 6,351,735 B1 | 2/2002 | Deaton et al. |
| 6,377,935 B1 | 4/2002 | Deaton et al. |
| 6,424,949 B1 | 7/2002 | Deaton et al. |
| 6,427,020 B1 | 7/2002 | Rhoads |
| 6,484,146 B2 | 11/2002 | Day et al. |
| 6,584,448 B1 | 6/2003 | Laor |
| 6,632,251 B1 | 10/2003 | Rutten et al. |
| 6,671,692 B1 | 12/2003 | Marpe et al. |
| 6,671,693 B1 | 12/2003 | Marpe et al. |
| 6,684,195 B1 | 1/2004 | Deaton et al. |
| 6,714,918 B2 | 3/2004 | Hillmer et al. |
| 6,757,898 B1 | 6/2004 | Ilsen et al. |
| 6,769,228 B1 | 8/2004 | Mahar |
| 6,795,809 B2 | 9/2004 | O'Brien et al. |
| 6,879,959 B1 | 4/2005 | Chapman et al. |
| 6,885,994 B1 | 4/2005 | Scroggie et al. |
| 7,013,284 B2 | 3/2006 | Guyan et al. |
| 7,024,374 B1 | 4/2006 | Day et al. |
| 7,058,584 B2 | 6/2006 | Kosinski et al. |
| 7,058,591 B2 | 6/2006 | Giuliani et al. |
| 7,111,173 B1 | 9/2006 | Scheidt |
| 7,111,780 B2 | 9/2006 | Broussard et al. |
| 7,155,397 B2 | 12/2006 | Alexander et al. |
| 7,225,052 B2 | 5/2007 | Foote et al. |
| 7,228,285 B2 | 6/2007 | Hull et al. |
| 7,233,913 B2 | 6/2007 | Scroggie et al. |
| 7,309,001 B2 | 12/2007 | Banfield et al. |
| 7,356,460 B1 | 4/2008 | Kennedy et al. |
| 7,380,707 B1 | 6/2008 | Fredman |
| 7,401,027 B2 | 7/2008 | Moore et al. |
| 7,415,426 B2 | 8/2008 | Williams et al. |
| 7,418,400 B1 | 8/2008 | Lorenz |
| 7,426,480 B2 | 9/2008 | Granger et al. |
| 7,438,218 B2 | 10/2008 | Dooley et al. |
| 7,640,170 B1 | 12/2009 | Gourley |
| 7,657,437 B2 * | 2/2010 | Kalies ............................ 705/1.1 |
| 7,926,709 B1 | 4/2011 | Dooley et al. |
| 2001/0001014 A1 | 5/2001 | Akins, III et al. |
| 2001/0032099 A1 | 10/2001 | Joao |
| 2001/0037216 A1 | 11/2001 | Oscar et al. |
| 2001/0037224 A1 | 11/2001 | Eldridge et al. |
| 2001/0041993 A1 | 11/2001 | Campbell |
| 2002/0002495 A1 | 1/2002 | Ullman |
| 2002/0035488 A1 | 3/2002 | Aquila et al. |
| 2002/0044043 A1 | 4/2002 | Chaco et al. |
| 2002/0049617 A1 | 4/2002 | Lencki et al. |
| 2002/0055856 A1 | 5/2002 | Adams |
| 2002/0065687 A1 | 5/2002 | Onoue |
| 2002/0087554 A1 | 7/2002 | Seelinger |
| 2002/0087583 A1 | 7/2002 | Morgan et al. |
| 2002/0111832 A1 | 8/2002 | Judge |
| 2002/0120473 A1 | 8/2002 | Wiggins |
| 2002/0128883 A1 | 9/2002 | Harris |
| 2002/0133503 A1 | 9/2002 | Amar et al. |
| 2002/0138593 A1 | 9/2002 | Novak et al. |
| 2002/0175370 A1 | 11/2002 | Bockelman |
| 2002/0183979 A1 | 12/2002 | Wildman |
| 2002/0198831 A1 | 12/2002 | Patricelli et al. |
| 2003/0009357 A1 | 1/2003 | Pish |
| 2003/0009367 A1 | 1/2003 | Morrison |
| 2003/0028404 A1 | 2/2003 | Herron et al. |
| 2003/0050799 A1 | 3/2003 | Jay et al. |
| 2003/0074218 A1 | 4/2003 | Liff et al. |
| 2003/0074222 A1 | 4/2003 | Rosow et al. |
| 2003/0083903 A1 | 5/2003 | Myers |
| 2003/0120588 A1 | 6/2003 | Dodd et al. |
| 2003/0125986 A1 | 7/2003 | Collosi |
| 2003/0149594 A1 | 8/2003 | Beazley et al. |
| 2003/0149625 A1 | 8/2003 | Leonardi et al. |
| 2003/0154163 A1 | 8/2003 | Phillips et al. |
| 2003/0191669 A1 | 10/2003 | Fitzgerald et al. |
| 2003/0229540 A1 | 12/2003 | Algiene |
| 2004/0006490 A1 | 1/2004 | Gingrich et al. |
| 2004/0019464 A1 | 1/2004 | Martucci et al. |
| 2004/0039599 A1 | 2/2004 | Fralic |
| 2004/0046020 A1 | 3/2004 | Andreasson et al. |
| 2004/0054657 A1 | 3/2004 | Takeyama |
| 2004/0073457 A1 | 4/2004 | Kalies |
| 2004/0078234 A1 | 4/2004 | Tallal, Jr. et al. |
| 2004/0093242 A1 | 5/2004 | Cadigan et al. |
| 2004/0107117 A1 | 6/2004 | Denny |
| 2004/0111277 A1 | 6/2004 | Pearson et al. |
| 2004/0111291 A1 | 6/2004 | Dust et al. |
| 2004/0117323 A1 | 6/2004 | Mindala |
| 2004/0138921 A1 | 7/2004 | Broussard et al. |
| 2004/0148198 A1 | 7/2004 | Kalies |
| 2004/0153336 A1 | 8/2004 | Virdee et al. |
| 2004/0172281 A1 | 9/2004 | Stanners |
| 2004/0188998 A1 | 9/2004 | Henthorn |
| 2004/0249745 A1 | 12/2004 | Baaren |
| 2005/0015280 A1 | 1/2005 | Gabel et al. |
| 2005/0033604 A1 | 2/2005 | Hogan |
| 2005/0033610 A1 | 2/2005 | Cunningham |

(56) References Cited

U.S. PATENT DOCUMENTS

| | | |
|---|---|---|
| 2005/0060201 A1 | 3/2005 | Connely, III et al. |
| 2005/0065821 A1 | 3/2005 | Kalies |
| 2005/0086075 A1 | 4/2005 | Kaehler et al. |
| 2005/0086081 A1 | 4/2005 | Brock-Fisher |
| 2005/0090425 A1 | 4/2005 | Reardan et al. |
| 2005/0102169 A1 | 5/2005 | Wilson |
| 2005/0125292 A1 | 6/2005 | Kassab et al. |
| 2005/0154627 A1 | 7/2005 | Zuzek et al. |
| 2005/0171815 A1 | 8/2005 | Vanderveen |
| 2005/0187793 A1 | 8/2005 | Myles |
| 2005/0197862 A1 | 9/2005 | Paterson, Jr. et al. |
| 2005/0240473 A1 | 10/2005 | Ayers et al. |
| 2005/0288972 A1 | 12/2005 | Marvin et al. |
| 2006/0015518 A1 | 1/2006 | Eletreby et al. |
| 2006/0020514 A1 | 1/2006 | Yered |
| 2006/0026041 A1 | 2/2006 | Ullman |
| 2006/0085230 A1 | 4/2006 | Brill et al. |
| 2006/0085231 A1 | 4/2006 | Brofman |
| 2006/0149587 A1 | 7/2006 | Hill, Sr. et al. |
| 2006/0149784 A1 | 7/2006 | Tholl et al. |
| 2006/0184391 A1 | 8/2006 | Barre et al. |
| 2006/0224415 A1 | 10/2006 | Hudson et al. |
| 2006/0229915 A1 | 10/2006 | Kosinski et al. |
| 2006/0247948 A1 | 11/2006 | Ellis et al. |
| 2006/0259363 A1 | 11/2006 | Jhetam et al. |
| 2006/0271398 A1 | 11/2006 | Belcastro |
| 2006/0271405 A1 | 11/2006 | Cipolle et al. |
| 2006/0271412 A1 | 11/2006 | Sohr et al. |
| 2006/0287886 A1 | 12/2006 | Kitazawa |
| 2007/0005402 A1 | 1/2007 | Kennedy et al. |
| 2007/0050209 A1 * | 3/2007 | Yered ............................ 705/2 |
| 2007/0088576 A1 | 4/2007 | de Beus et al. |
| 2007/0124177 A1 | 5/2007 | Engleson et al. |
| 2007/0136100 A1 | 6/2007 | Daugherty et al. |
| 2007/0179957 A1 | 8/2007 | Gibson et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2007/0276697 A1 | 11/2007 | Wiley et al. |
| 2008/0275723 A1 | 11/2008 | Wiley et al. |

FOREIGN PATENT DOCUMENTS

| | | |
|---|---|---|
| WO | 9106917 A1 | 5/1991 |
| WO | 9503569 A3 | 2/1995 |
| WO | 9725682 A1 | 7/1997 |
| WO | 9850871 A1 | 11/1998 |
| WO | 0039737 A1 | 7/2000 |
| WO | 2007025295 A2 | 3/2007 |

OTHER PUBLICATIONS

Non-final Office Action dated Oct. 25, 2010 for related U.S. Appl. No. 12/242,307 (filed Sep. 30, 2008).

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic: On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

"Two automatic identification technology, neither new in the sense if being recent developments . . ." Patient Safety & Quality Healthcare [Online] Aug. 2005. URL: http://www.awarix.com.

"Subnotebooks, Phones, and More. St. Vincent's Gets on Track." Mobile Health Data [Online], Nov. 19, 2004. URL: http://www.awarix.com.

"Coping with Information Overload." The News Source for Healthcare Information Technology [Online] Nov. 2004. URL: http://www.awarix.com.

"St. Vincent's first to use Birmingham startup's information system." The Birmingham News [Online] Apr. 11, 2005. URL: http://www.awarix.com.

"St. Vincent's is Digital Flagship" D. Lockridge; Birmingham Medical News [Online] Sep. 2005. URL: http://www.awarix.com.

Non-Final Office Action for U.S. Appl. No. 12/242,307 mailed Sep. 9, 2011.

Non-Final Office Action for U.S. Appl. No. 12/729,555 mailed Nov. 6, 2012.

Final Office Action for U.S. Appl. No. 12/729,555 mailed May 9, 2013.

Final Office Action for U.S. Appl. No. 12/242,307 mailed Feb. 1, 2012.

Non-Final Office Action for U.S. Appl. No. 12/729,555 mailed Sep. 13, 2013.

* cited by examiner

SYSTEMS AND METHODS FOR FACILITATING THE ESTABLISHMENT OF PHARMACEUTICAL REBATE AGREEMENTS

RELATED APPLICATION

This application claims priority to U.S. Provisional Ser. No. 61/041,786, entitled "Pharmaceutical Rebate Marketplaces and Methods for Providing the Same," filed on Apr. 2, 2008, the contents of which are incorporated by reference in their entirety.

FIELD OF THE INVENTION

This invention relates generally to pharmaceutical rebates and more specifically to systems and methods for facilitating the establishment of pharmaceutical rebate agreements.

BACKGROUND OF THE INVENTION

Drug manufacturers typically offer rebates in association with the sale and distribution of their drugs. Payers of pharmacy benefits, such as health plan providers, pharmacy benefit managers ("PBMs"), and large employer groups, typically leverage these pharmaceutical manufacturer rebates in order to manage drug costs and to ensure that their benefit offerings are competitive. Rebate arrangements are often negotiated with manufacturers, whereby rebates are provided if a set of terms and/or conditions associated with the offering of certain drugs is satisfied.

The process for negotiating rebates with manufacturers is typically time consuming. Additionally, the management of various arrangements between multiple parties is often challenging for both payers of pharmacy benefits and for drug manufacturers. Due to the significant effort, small to mid-size organizations often cannot negotiate rebates directly with drug manufacturers and, therefore, are typically forced to utilize rebate management services. In these situations, the small to mid-size organizations are often required to adhere to the terms and/or conditions for rebates that are negotiated by the rebate management services. Additionally, these conventional rebate management services are often offered by PBMs in competition with the small to mid-size organizations. As a result, the small to mid-size organizations are typically required to use the competing PBM drug formularies and to adhere to other rules enforced by the rebate management services. These requirements may limit the ability for these small to mid-size organizations to provide competitive offerings in the marketplace.

Accordingly, there is a need for systems and methods for facilitating the establishment of pharmaceutical rebate agreements or arrangements. There is also a need for pharmaceutical rebate marketplaces and methods for providing the same.

BRIEF DESCRIPTION OF THE INVENTION

Some or all of the above needs and/or problems may be addressed by certain embodiments of the invention. Embodiments of the invention may include systems and methods for facilitating the establishment of pharmaceutical rebate agreements or arrangements. In one embodiment, a method for facilitating the establishment of a pharmaceutical rebate agreement is provided. The method may include receiving, from a drug manufacturer via a network, one or more rebate offers associated with one or more pharmaceutical products manufactured by the drug manufacturer, wherein one or more respective conditions associated with the one or more rebate offers are established by the drug manufacturer. At least a portion of the one or more rebate offers may be electronically presented to a payer of pharmaceutical benefits. A selection of at least one of the presented rebate offers may be received from the payer via the network. The selection may initiate an enrollment of the payer for the at least one selected rebate offer.

In accordance with another embodiment of the invention, a system for facilitating the establishment of a pharmaceutical rebate agreement is provided. The system may include at least one memory, a communications interface, and at least one processor. The at least one memory may be operable to store information associated with one or more rebate offers associated with one or more pharmaceutical products manufactured by the drug manufacturer, wherein the stored information includes one or more respective conditions associated with the one or more rebate offers. The communications interface may be operable to receive and transmit communications over a network. The at least one processor may be operable to receive, via the communications interface, the one or more rebate offers and to electronically present at least a portion of the one or more rebate offers to a payer of pharmaceutical benefits. The at least one processor may further be operable to receive, via the communications interface, a selection of at least one of the presented rebate offers from the payer, wherein the selection initiates an enrollment of the payer for the at least one selected rebate offer.

According to yet another embodiment of the invention, a computer-implemented method for facilitating the establishment of pharmaceutical rebate arrangements may be provided. An offer for a rebate arrangement associated with one or more pharmaceutical products of a drug manufacturer may be received via a network. Information associated with the offer may be presented to a payer of pharmaceutical benefits via the network. An indication of acceptance of the offer by the payer may be received via the network. The enrollment of the payer in the rebate arrangement may be facilitated based at least in part on the received indication of acceptance.

Additional systems, methods, apparatuses, features, and aspects are realized through the techniques of various embodiments of the invention. Other embodiments and aspects of the invention are described in detail herein and are considered a part of the claimed invention. Other advantages and features can be understood with reference to the description and the drawings.

BRIEF DESCRIPTION OF THE FIGURES

Figure 1:
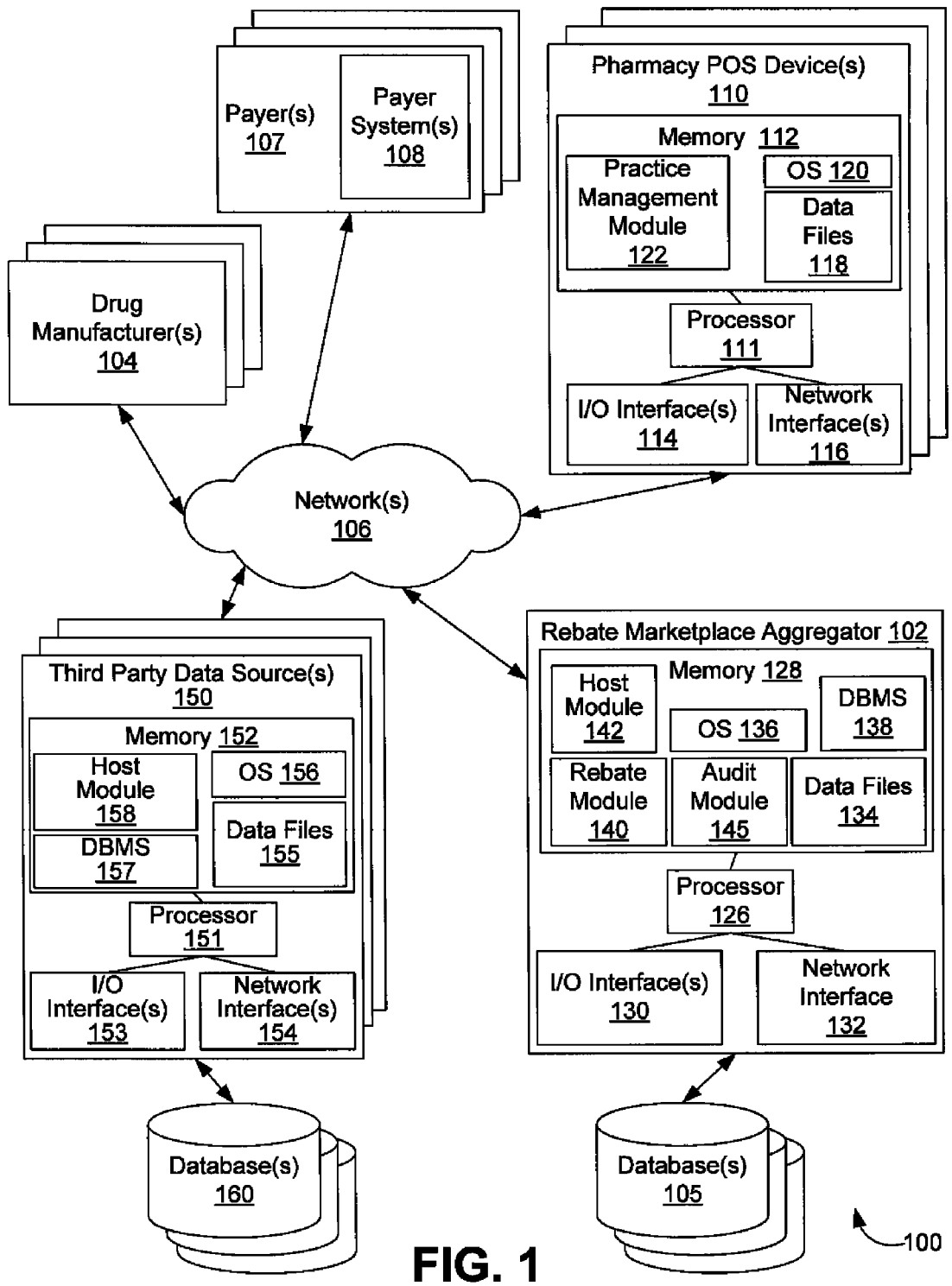

Having thus described the invention in general terms, reference will now be made to the accompanying drawings, which are not necessarily drawn to scale, and wherein:

FIG. 1 shows a block diagram of one example system for facilitating the establishment of pharmaceutical rebate arrangements, according to an illustrative embodiment of the invention.

Figure 2:
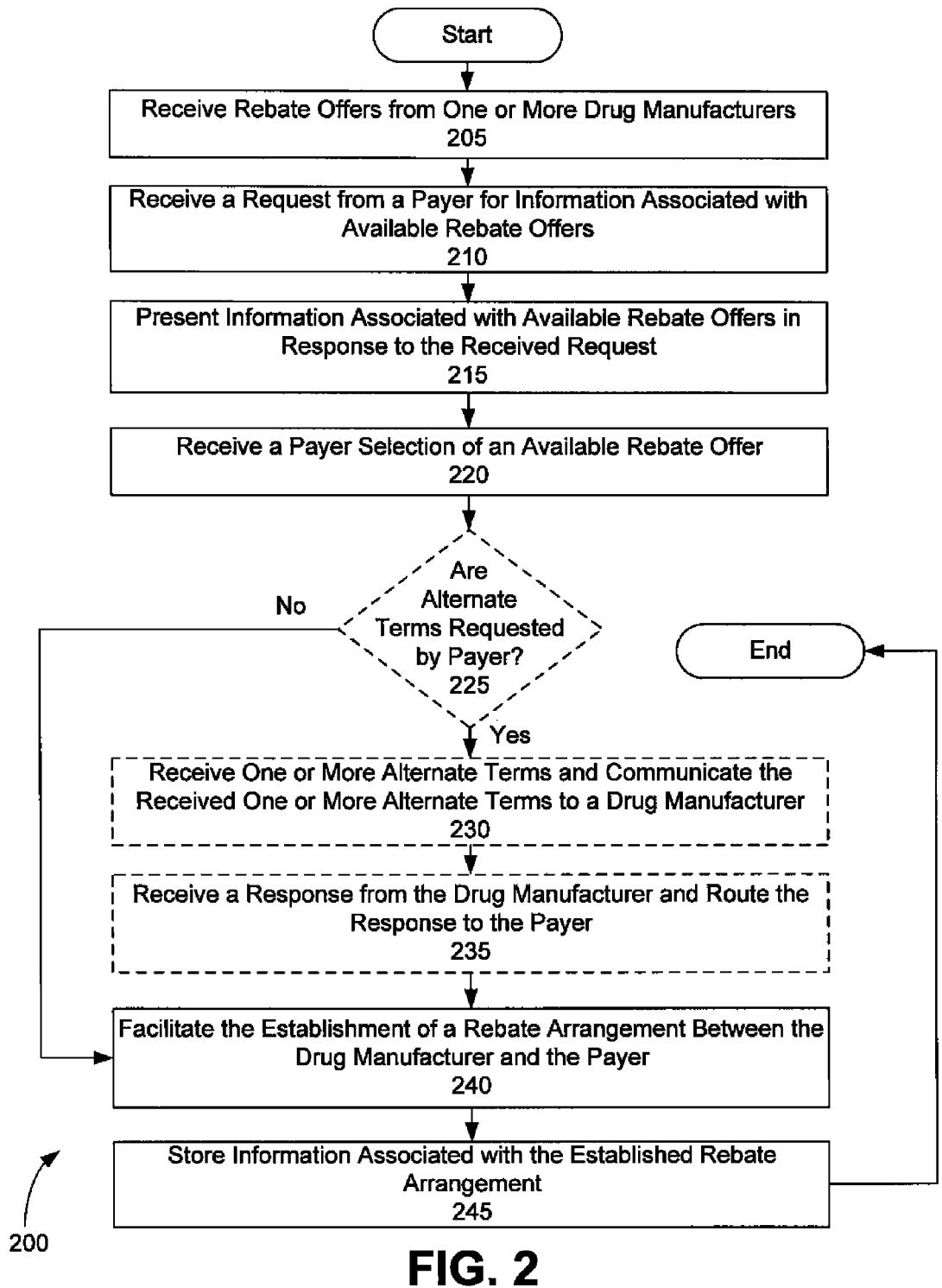

FIG. 2 is a flowchart showing one example method for facilitating the establishment of a pharmaceutical rebate arrangement at a rebate marketplace aggregator, according to an illustrative embodiment of the invention.

Figure 3:
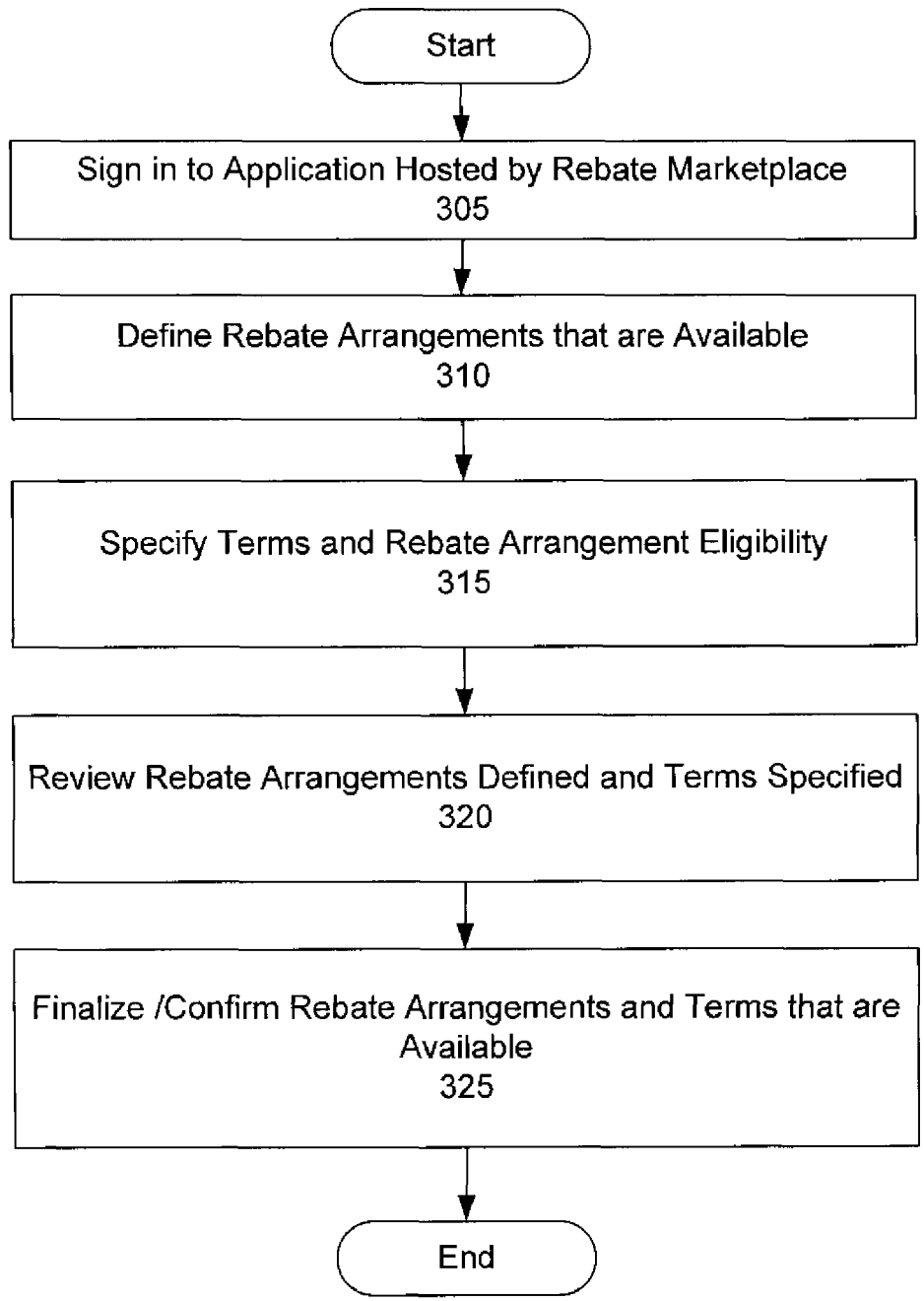

FIG. 3 is a flowchart showing one example method for drug manufacturers to communicate rebate offers to a rebate marketplace aggregator, according to an illustrative embodiment of the invention.

Figure 4:
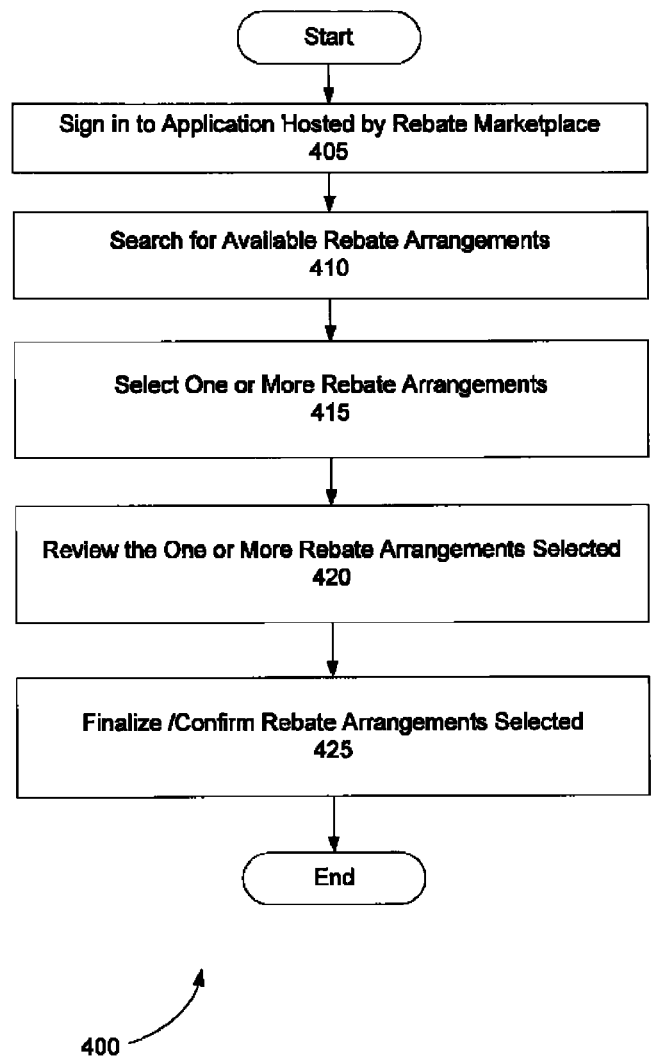

FIG. 4 is a flowchart showing one example method for payers to select a rebate offer at a rebate marketplace aggregator in order to enter into a rebate arrangement with a drug manufacturer, according to an illustrative embodiment of the invention.

Figure 5:
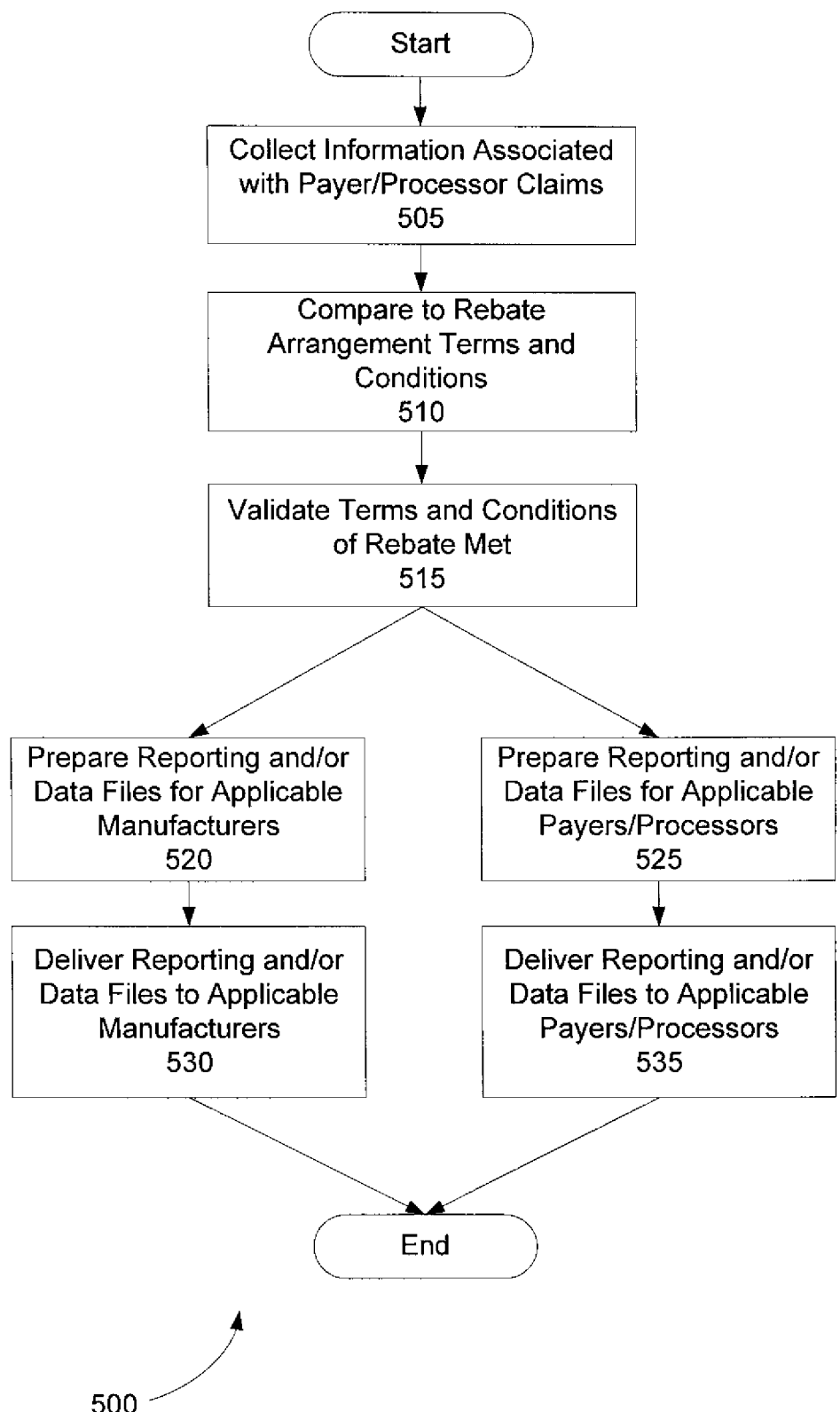

FIG. 5 is a flowchart showing one example method for auditing claim transactions, according to an illustrative embodiment of the invention.

Figure 6:
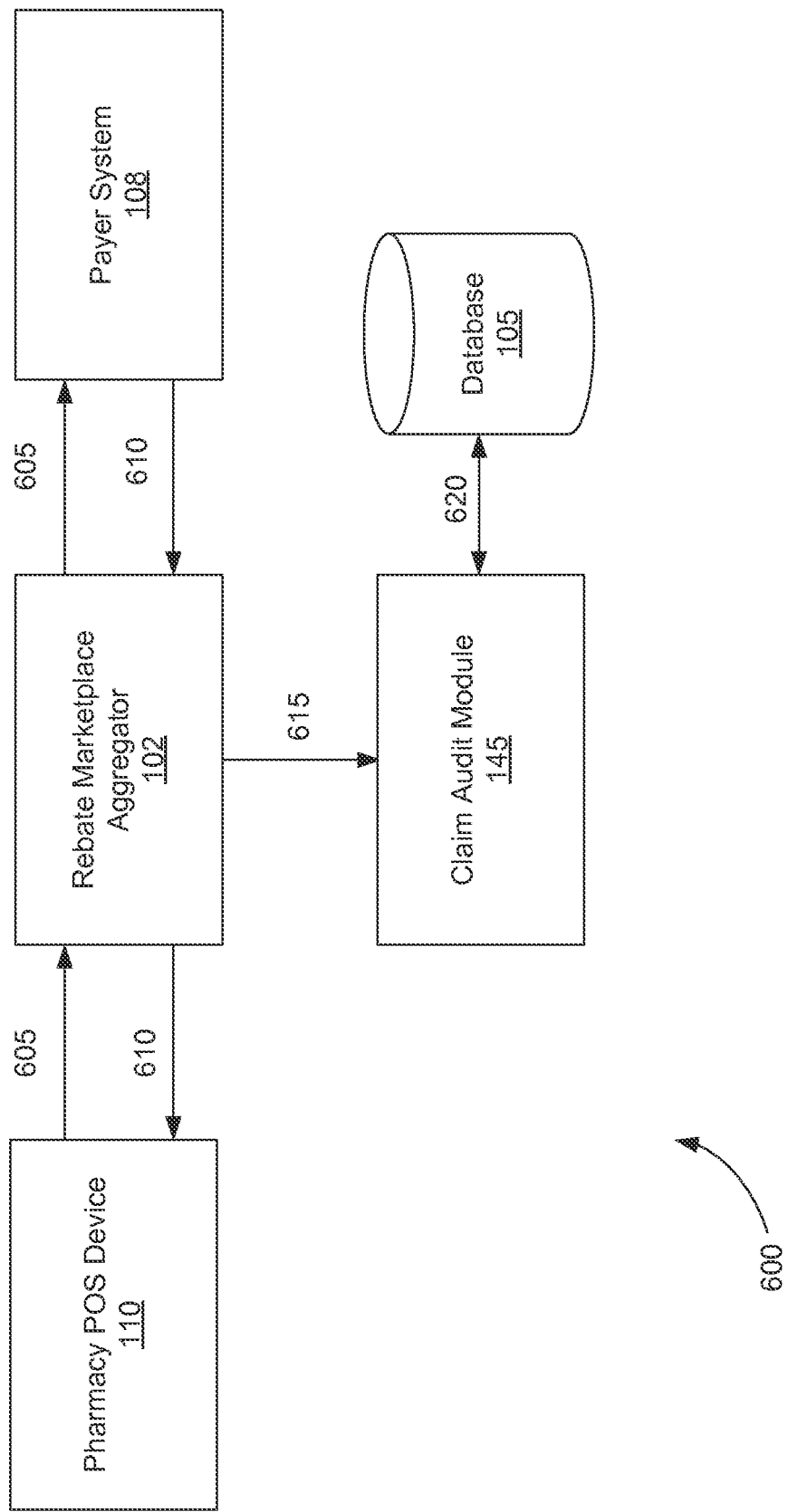

FIG. 6 illustrates an example block diagram of collecting information associated with pharmaceutical claims in order to facilitate an audit of the claims, according to an illustrative embodiment of the invention.

Figure 7:
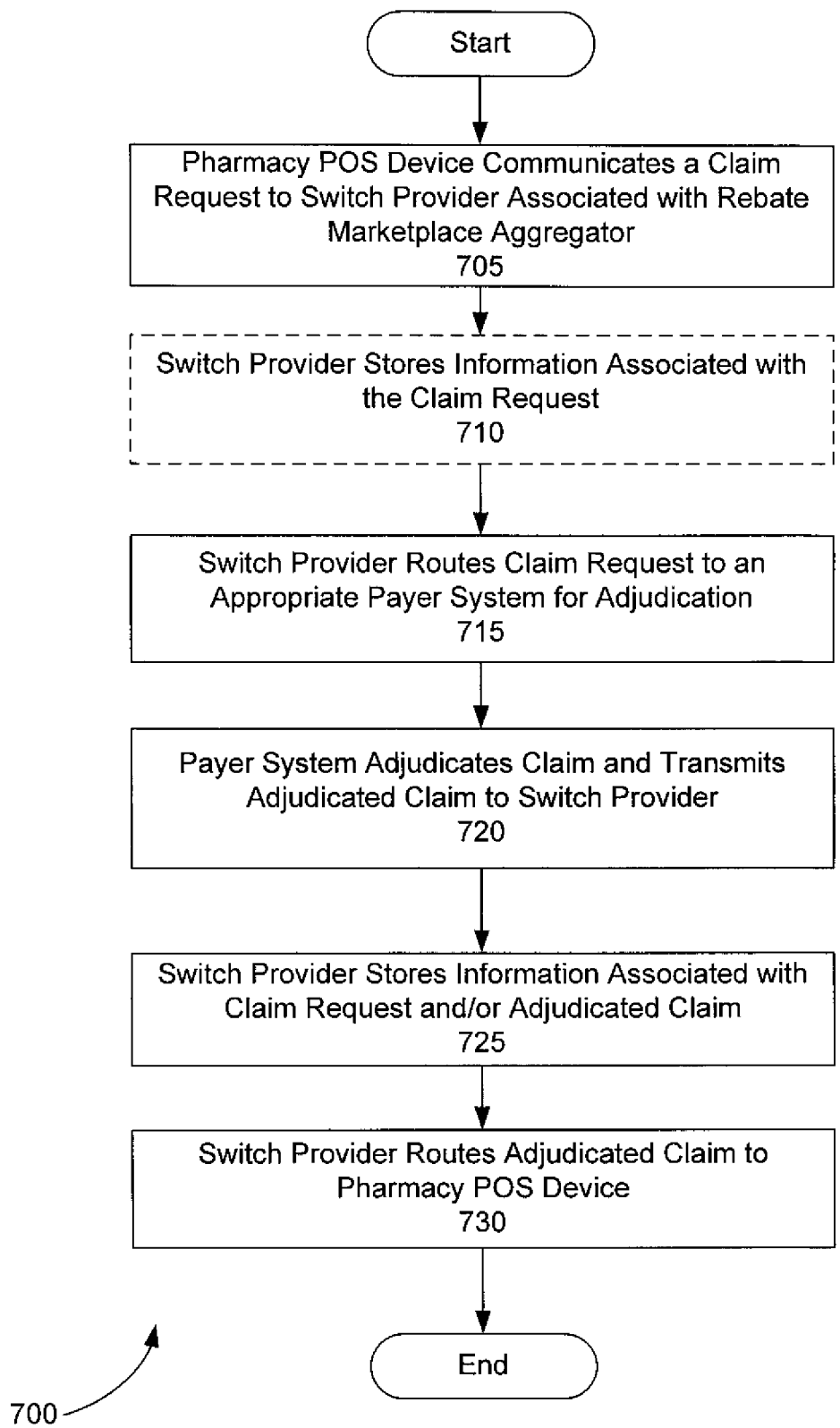

FIG. 7 is a flowchart showing one example method for collecting information associated with pharmaceutical claims, according to an illustrative embodiment of the invention.

Figure 8:
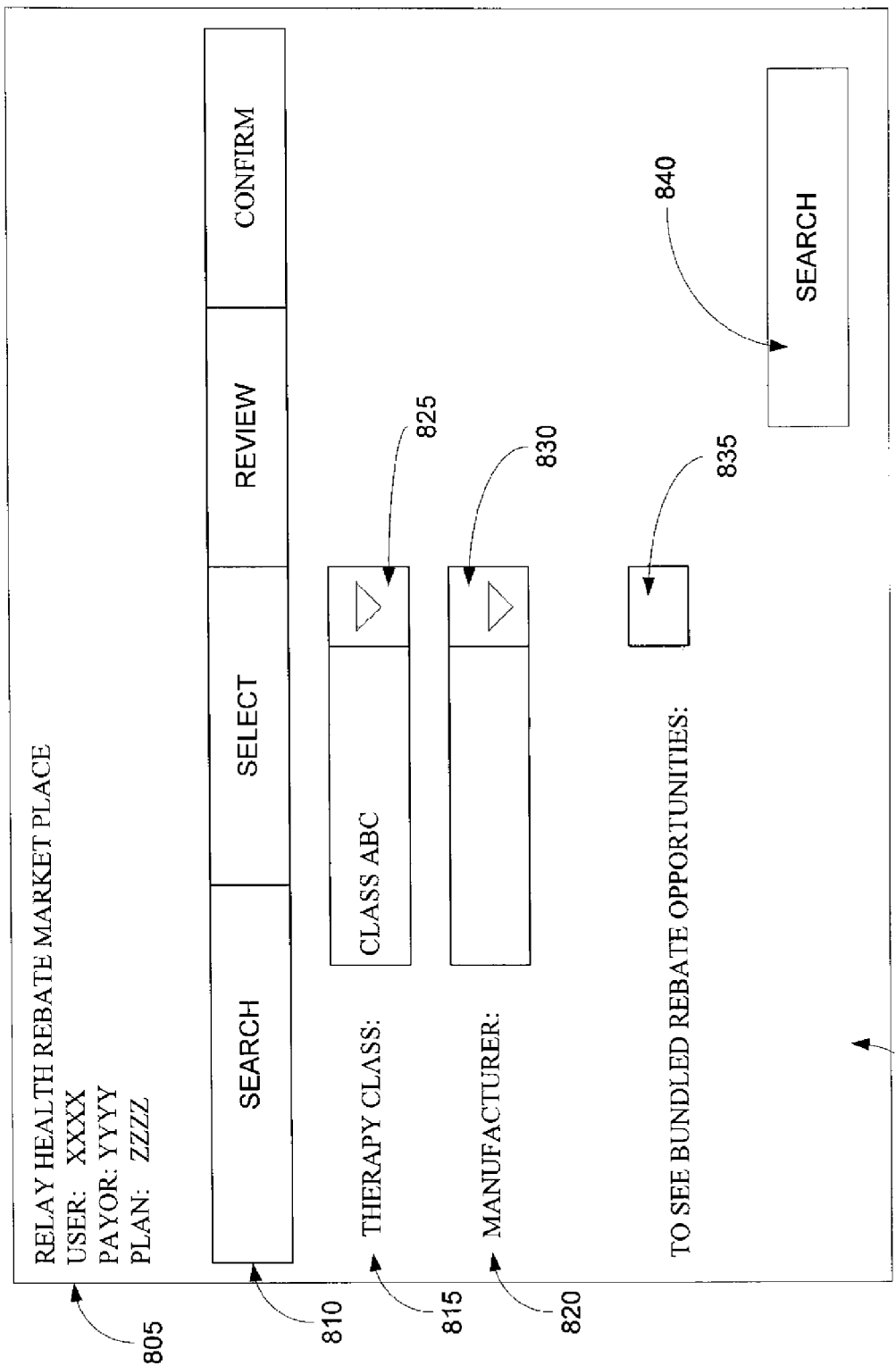

FIG. 8 shows one example graphical user interface that facilitates searching for rebate offers, according to an illustrative embodiment of the invention.

Figure 9:
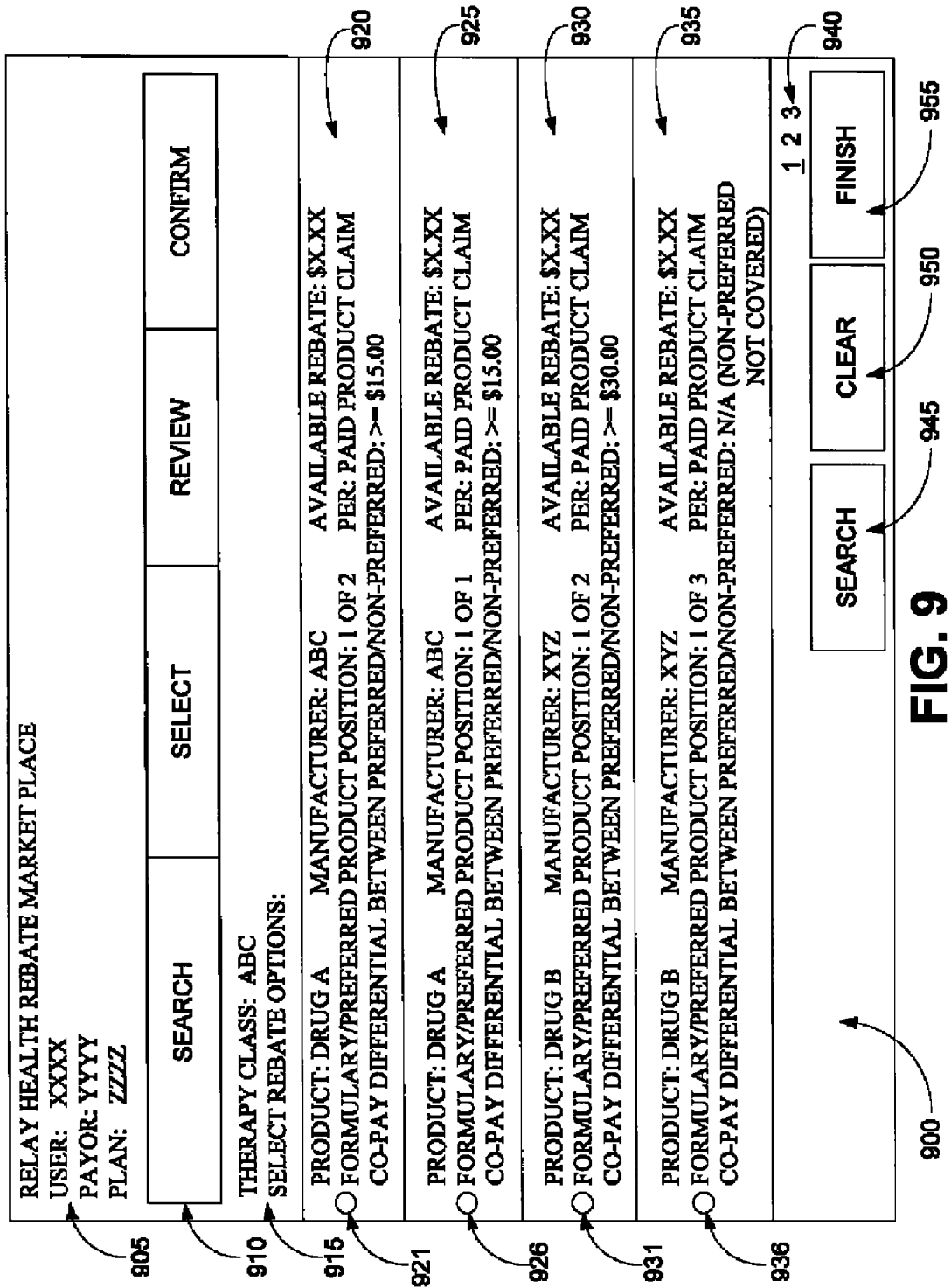

FIG. 9 shows one example graphical user interface that facilitates the display of rebate offers as the result of a search, according to an illustrative embodiment of the invention.

DETAILED DESCRIPTION OF THE INVENTION

Embodiments of the invention are directed to systems and methods for facilitating the establishment of pharmaceutical rebate agreements and/or arrangements. In certain embodiments, pharmaceutical rebate marketplaces are provided. In an example embodiment of the invention, a pharmaceutical rebate marketplace may serve as an aggregation system that receives and stores rebate offers from one or more drug manufacturers. The received rebate offers may be associated with individual drugs offered by the manufacturers and/or with bundles of drugs offered by the manufacturers. One or more payers of pharmacy benefits, such as health plan providers, pharmacy benefit managers (PBMs), and employer groups, may access the pharmaceutical rebate marketplace and review available rebate offers. A payer may select and/or enroll for one or more rebate offers at the pharmaceutical rebate marketplace. Following enrollment for one or more rebates, a claim audit module associated with the rebate marketplace may collect information associated with claims submitted by a healthcare provider (e.g., pharmacy, hospital, doctor's office, etc). The claim audit module may audit the claims and determine whether or not terms, conditions, and/or other requirements associated with rebates for which a payer has enrolled have been satisfied. In association with this determination, various reports and/or other information may be communicated to the drug manufacturers.

In certain embodiments of the invention, a claim audit module may be incorporated into the pharmaceutical rebate marketplace. However, in other embodiments of the invention, the claim audit module may be incorporated into another system or provided as a stand alone system, and the claim audit module may be in communication with the pharmaceutical rebate marketplace.

For purposes of this disclosure, the terms "pharmaceutical rebate marketplace" and "rebate marketplace aggregator" may be utilized interchangeably to refer to one or more systems and/or entities that facilitate the establishment of rebate agreements or rebate arrangements between one or more drug manufacturers and one or more payers of pharmacy benefits.

Example embodiments of the invention now will be described more fully hereinafter with reference to the accompanying drawings, in which example embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 shows a block diagram of one example system 100 for facilitating the establishment of pharmaceutical rebate arrangements, according to an illustrative embodiment of the invention. In particular, FIG. 1 is an example of an operating environment for implementation of certain embodiments of the invention, including a rebate marketplace aggregator 102 component, one or more drug manufacturers 104, one or more payers 107, and/or one or more point-of-service ("POS") devices such as a pharmacy POS device 110. Additionally, in certain embodiments of the invention, one or more third party data sources 150 may be provided. Each of these devices, components, or systems may be configured for accessing and reading associated computer-readable media having stored thereon data and/or computer-executable instructions for implementing the various methods of the invention. Generally, network devices and systems include hardware and/or software for transmitting and receiving data and/or computer-executable instructions over a communications link and a memory for storing data and/or computer-executable instructions. Network devices and systems may also include a processor for processing data and executing computer-executable instructions, as well as other internal and peripheral components that are well known in the art. As used herein, the term "computer-readable medium" describes any form of memory or a propagated signal transmission medium. Propagated signals representing data and computer-executable instructions are transferred between network devices and systems.

The one or more drug manufacturers 104 may include any number of suitable manufacturers and/or providers of pharmaceuticals, prescription products, and/or prescription benefits. These manufacturers and/or providers may offer and enter into rebate arrangements or rebate agreements for one or more of their products and/or benefits. Additionally, the one or more drug manufacturers 104 may include any other provider or offerer of pharmaceutical rebate arrangements, for example, rebate concatenators. The term "drug manufacturer" is utilized herein by way of example only.

The one or more payers 107 may include any suitable payer and/or adjudicator of pharmaceutical, prescription, and/or medical claims. For example, a payer 107 may be a health plan provider, an insurance provider, a pharmacy benefit manager (PBM), or an employer group. Furthermore, the terms "payer" and "adjudicator" may be used interchangeably.

With reference to FIG. 1, the rebate marketplace aggregator 102 may be any processor-driven device that is configured for facilitating the establishment of a pharmaceutical rebate agreement or arrangement. The rebate marketplace aggregator 102 may therefore include one or more processors 126, one or more memories 128, one or input/output ("I/O") interface(s) 130, and one or more network interfaces 132. The memory 128 may store data files 134 and various program modules, such as an operating system ("OS") 136, a database management system ("DBMS") 138, a host module 142, a rebate module 140, and a claim audit module 145 (also referred to herein as the "audit module"). The rebate marketplace aggregator 102 may include additional program modules (not shown) for providing clearinghouse services. The clearinghouse services may facilitate the routing and/or processing of pharmaceutical claims. The host module 142 may receive, process, and respond to requests associated with the offering of, selection of, and/or establishment of pharmaceutical rebate agreements. Additionally, in certain embodiments, the host module 142 or an associated host module may receive, process, and respond to requests to route and/or otherwise process pharmaceutical claim transactions. The host module 142 or an associated host module may also receive, process, and respond to requests to conduct one or more audits of pharmaceutical claims. Additionally, in certain embodiments, the host module 142 or an associated host module may facilitate requests for and the receipt of information from the one or more third party data sources 150.

Those skilled in the art will appreciate that the rebate marketplace aggregator 102 may include alternate and/or additional components, hardware and/or software. Additionally, certain components of the rebate marketplace aggregator 102 may be embodied in a plurality of associated systems in certain embodiments of the invention. In addition, the rebate marketplace aggregator 102 may be connected to a local or wide area network (not shown) that includes other devices, such as routers, firewalls, gateways, etc.

In certain embodiments of the invention, the rebate marketplace aggregator 102 may include or be in communication with one or more suitable memory devices, such as databases 105. The databases 105 may store, for example, data relating to rebate offers and/or data relating to rebate arrangements between payers 107 and one or more drug manufacturers 104. In some embodiments of the invention, the databases 105 or other suitable memory devices may store information associated with pharmaceutical claim transactions. The databases 105 or other suitable memory devices may also store data associated with claim audits and/or reports and other data relating to the results of the claim auditing processes. The databases 105 or other suitable memory devices may also store any other data used or generated by the rebate marketplace aggregator 102, the rebate module 140, or the claim audit module 145. Although a single database 105 may be utilized in certain embodiments of the invention, those skilled in the art will appreciate that multiple physical and/or logical databases may be used to store the above mentioned data. For security, the rebate marketplace aggregator 102 may have a dedicated connection to one or more databases 105, as shown. However, the rebate marketplace aggregator 102 may also communicate with one or more databases 105 via one or more suitable networks 106.

The rebate module 140 may be provided as a component of the rebate marketplace aggregator 102 in certain embodiments of the invention. The rebate module 140 may facilitate the establishment of rebate arrangements between drug manufacturers 104 and payers 107. Examples of the operations of the rebate module 140 and the rebate marketplace aggregator 102 for facilitating the establishment of a rebate arrangement are set forth below.

As shown in FIG. 1, one or more drug manufacturers 104 and one or more payers 107 may be in communication with the rebate marketplace aggregator 102 via one or more suitable networks 106. The one or more drug manufacturers 104 may be configured to transmit or otherwise communicate respective rebate offers to the rebate marketplace aggregator 102 that may then be offered to the one or more payers 107 for selection. In certain embodiments of the invention, the one or more drug manufacturers 104 may initiate the communication of rebate offers to the rebate marketplace aggregator 102. For example, a drug manufacturer 104 may access the rebate marketplace aggregator 102 and communicate one or more rebate offers to the rebate marketplace aggregator 102. In accordance with certain embodiments of the invention, a drug manufacturer 104 may enroll with the rebate marketplace aggregator 102. In this regard, the rebate marketplace aggregator 102 may prompt a drug manufacturer 104 for log-in and/or other security information in association with accessing the rebate marketplace aggregator 102 in order to upload or otherwise communicate information associated with rebate offers.

In accordance with other embodiments of the invention, the rebate marketplace aggregator 102 may initiate communication with a drug manufacturer 104 in order to obtain information associated with rebate offers. For example, the rebate marketplace aggregator 102 may communicate an e-mail invitation to a drug manufacturer 104 that solicits the drug manufacturer 104 for information associated with rebate offers. The e-mail invitation may include at least one hypertext link that facilitates the creation of a network connection (e.g., an Internet connection) between the rebate marketplace aggregator 102 and the drug manufacturer 104. Once a network connection is established, the drug manufacturer 104 may enroll with the rebate marketplace aggregator 102 and/or communicate information associated with rebate offers to the rebate marketplace aggregator 102.

As another example of collecting rebate offer information, the rebate marketplace aggregator 102 may periodically collect new, revised, and/or updated rebate offers from drug manufacturers 104 by polling the drug manufacturers 104 at predetermined intervals, such as once a day, once a week, or once a month. Alternatively, a drug manufacturer 104 may be configured to communicate new, revised, and/or updated rebate offers to the rebate marketplace aggregator 102 at predetermined intervals.

In certain embodiments of the invention, the rebate marketplace aggregator 102 may additionally or alternatively collect rebate offer information from one or more third party data sources 150. For example, one or more drug manufacturers 104 may communicate rebate offer information to one or more third party data sources 150, and at least a portion of the rebate offer information may be communicated to the rebate marketplace aggregator 102 from the one or more third party data sources 150.

Additionally, as an alternative to the electronic communication of rebate offers to the rebate marketplace aggregator 102 via one or more suitable networks 106, one or more rebate offers may be communicated to the rebate marketplace aggregator 102 via non-electronic means, such as via snail mail. In such a situation, the rebate offers may be manually entered, scanned, and/or optically read at the rebate marketplace aggregator 102. In certain embodiments of the invention, the enrollment of a drug manufacturer 104 may also be accomplished via non-electronic means, such as via snail mail.

In accordance with an aspect of the invention, the rebate marketplace aggregator 102 may receive rebate offers and store them in one or more suitable memory devices, such as in one or more databases 105. A wide variety of information may be received in association with a rebate offer, such as a brand name and/or generic name of one or more drugs associated with the rebate offer, a manufacturer of the one or more drugs, one or more therapy classes or therapeutic classes associated with a drug, the identification of one or more competitor drugs within the same therapeutic class, the rebate type (e.g., flat, access, market share, tiered, etc.), an amount of the rebate offer, and/or a variety of terms and/or conditions associated with the rebate offer. Terms and/or conditions associated with a rebate offer may include, for example, a requirement that a drug be listed as a preferred or formulary drug of a payer within an applicable therapeutic class, a limitation on the number of preferred drugs that may be offered by the payer within the therapeutic class, and/or a required co-payment differential between preferred drugs and non-preferred drugs offered within the therapeutic class. Different rebate amounts may be available for various sets of terms and/or conditions. Additionally, different rebate offers may be available if multiple drugs of a manufacturer and/or any affiliated, subsidiary, or partner manufacturers are bundled together. Additional incentives may also be tied to a rebate offer that may increase or decrease the amount of a rebate if certain conditions are met or if certain conditions are not met. For example, an incentive may provide for a larger rebate if a drug offered, covered, or sponsored by a payer achieves a certain market share.

The rebate offers may be managed, sorted, and formatted for display by a rebate module 140 associated with the rebate marketplace aggregator 102. One or more payers 107, such as health plan providers, pharmacy benefit managers (PBMs), and employer groups, may then access the rebate marketplace aggregator 102 to review available rebate offers. Similar to the drug manufacturers 104, the payers 107 may enroll with the rebate marketplace aggregator 102. The enrollment process may be conducted electronically or non-electronically. For example, the enrollment process may be initiated by the selection of a hypertext link that is included as a part of an enrollment invitation communicated to a payer 107 by the rebate marketplace aggregator 102 or, alternatively, the enrollment process may be initiated by a payer 107 directly accessing a web site of the rebate marketplace aggregator 102.

Once a payer 107 has enrolled with the rebate marketplace aggregator 102, the payer 107 may access the rebate marketplace aggregator 102 and review available rebate offers. The rebate module 140 may format available rebate offers for communication to the payer 107 and/or for display to a payer via one or more suitable graphical user interfaces, such as web pages. A list of all available rebate offers may be provided to a payer 107 or, alternatively, lists of rebate offers may be sorted in accordance with certain parameters, such as a therapeutic class and/or a drug manufacturer. Additionally, a payer 107 may provide search criteria to the rebate marketplace aggregator 102 that are used by the rebate module 140 to narrow a list of rebate offers that are displayed to a payer. In certain embodiments of the invention, rebate offers associated with bundles of more than one drug may also be provided to the payer 107 for review. These bundles may be provided by default or based upon a selection of the payer to be provided with bundles.

Terms and/or conditions that are associated with a rebate offer may also be provided to a payer 107. These terms and/or conditions, or a portion of these terms and/or conditions may be provided in association with a provided list of rebate offers. Alternatively, these terms and/or conditions may be provided based at least in part on a selection of a particular rebate offer by a payer. For example, a web page with details of the rebate offer may be presented to a payer 107 once the payer 107 selects a particular rebate offer.

In certain embodiments of the invention, a payer 107 may negotiate the rebate amount, terms and/or conditions of a rebate offer with a drug manufacturer 104 via the rebate marketplace aggregator 102. For example, a counteroffer may be communicated to the rebate marketplace aggregator 102 by the payer 107, and the rebate marketplace aggregator 102 may communicate the counteroffer to the drug manufacturer 104. The drug manufacturer 104 may either accept the counteroffer or continue the negotiation process by providing another counteroffer. This information may be communicated to the rebate marketplace aggregator 102 by the drug manufacturer 104 and then passed on to the payer 107. If an agreement is reached during the negotiation process, the rebate amount, terms and/or conditions of the agreement may be stored by the rebate marketplace aggregator 102. In some embodiments of the invention, a particular drug manufacturer 104 may not be willing to negotiate rebate offers or may only be willing to negotiate rebate offers with certain payers or with payers of a certain size. Additionally, a drug manufacturer 104 may not be willing to review a counteroffer that fails to satisfy certain minimum requirements. These preferences and/or requirements may be stored by the rebate marketplace aggregator 102 and any counteroffers received by the rebate marketplace aggregator 102 from a payer 107 may be compared to these preferences and/or requirements before being communicated to the drug manufacturer 104. In this regard, counteroffers may be screened and only counteroffers that a drug manufacturer 104 is willing to consider will be sent to the drug manufacturer.

Following the review of rebate offers and/or any negotiation, a selection of one or more available rebate offers and/or bundles of rebate offers may be received from the payer 107. The selection may be received via electronic means, such as via a web page or e-mail, or, alternatively, the selection may be received via non-electronic means, such as via snail mail. By selecting a particular rebate offer or bundle of rebate offers, a payer 107 agrees to adhere to any terms and/or conditions associated with the rebate offer. The rebate marketplace aggregator 102 may store information associated with rebate offers that are selected by a payer 107, and the rebate marketplace aggregator 102 may manage the rebate offers on behalf of the drug manufacturers 104 and/or the payers 107. In this regard, the rebate marketplace aggregator 102 provides drug manufacturers 104 with the opportunity to work with various payers 107 and other healthcare stakeholder organizations to move market share for their products effectively, while decreasing the effort and risk involved in managing various relationships directly.

Additionally, as an alternative to the electronic review and selection of rebate offers by a payer 107, one or more rebate offers may be reviewed and selected via one or more conventional means, such as via snail mail. For example, available rebate offers may be mailed or faxed to a payer 107 and the payer 107 may complete a selection form that is mailed or faxed back to the rebate marketplace aggregator 102. In certain embodiments of the invention, the enrollment of a payer 107 may also be accomplished via non-electronic means, such as via snail mail.

In accordance with another aspect of the invention, the rebate marketplace aggregator 102 or a system or entity associated with the rebate marketplace aggregator 102 (e.g., a pharmacy claims switch managed by RelayHealth™) may include a claim audit module 145 that collects and audits claims that are submitted for a payer 107. The claim audit module 145 may facilitate one or more audits of pharmaceutical claim transactions. Information associated with claim transactions may be collected by the rebate marketplace aggregator 102 and/or by systems associated with the rebate marketplace aggregator 102 and/or the claim audit module 145 utilizing a wide variety of different methods, techniques, and/or devices. For example, information associated with pharmaceutical claim transactions may be collected in real time or near real time as claim transactions are processed and/or routed by a switch provider that is associated with the rebate marketplace aggregator 102 and/or the claim audit module 145. Information associated with claim transactions may also be collected from one or more third party data sources 150.

According to an aspect of the invention, one or more suitable memory devices, such as database 105, may be associated with the rebate marketplace aggregator 102. The rebate marketplace aggregator 102 may store information associated with pharmacy claim transactions in the database 105. A wide variety of different information may be stored in the database 105 as desired in various embodiments of the invention. Information that may be stored includes, but is not limited to, identification information for a patient that is filling a subscription or obtaining prescribed medical equipment at a pharmacy or other medical care provider (e.g., hospital) associated with the pharmacy POS device 110 (e.g., name, address, zip code, date of birth, gender, etc.), insurance information associated with the patient (e.g., primary insurance provider, secondary insurance provider, insurance member identifiers, group numbers, co-pay amount, etc.), information associated with the prescribed drugs and/or medical equipment (e.g., an identification of the drug such as a National Drug Code ("NDC"), drug name, drug manufacturer, prescription amount, expiration date, price of the drug, etc.), information associated with the payment method utilized by the patient (e.g., cash, credit, check, etc.), information associated with the pharmacy or other medical care provider associated with the pharmacy POS device 110 (e.g., name of pharmacy, pharmacy identification number, address of pharmacy, name of pharmacists, etc.), information associated with the prescribing healthcare provider (e.g., a physician/prescriber identification, a physician/prescriber name, etc.) the date and time of the claim transaction request, information associated with the payer 107 (e.g., a Banking Identification Number ("BIN")/Processor Control Number ("PCN") for identifying a payer 107 as a destination of a claim request, a name of the third-party processing system, etc.), a group identification, and/or information associated with the adjudication of the claim by a payer 107 (e.g., status of the claim adjudication, whether the claim was paid, amount paid, co-payment amount, co-insurance amount, other patient payment amount, date paid, etc.). Additionally, the database 105 may be utilized to store information associated with a wide variety of different types of pharmacy claim transactions or prescription claim transactions including, but not limited to, insurance claim transactions, credit card transactions, check transactions, and/or cash transactions.

Additionally, information associated with rebate arrangements between various drug manufacturers 104 and payers 107 may be stored in one or more suitable memory devices, such as database 105. The information associated with rebate arrangements may be utilized in one or more audits that are conducted on processed claim transactions. For example, various parameters or other information associated with rebate arrangements may be compared to processed claim transactions in order to determine whether the terms and conditions of the rebate arrangements are being adhered to by the payers 107. A wide variety of different information associated with rebate arrangements may be stored as desired in various embodiments of the invention including, but not limited to, a brand name and/or generic name of one or more drugs associated with the rebate offer, a manufacturer of the one or more drugs, one or more therapy classes or therapeutic classes associated with a drug, an amount of the rebate offer, and/or a variety of terms and/or conditions associated with the rebate offer.

Additionally, a wide variety of different parameters and/or preferences for auditing processed claim transactions may be stored in one or more suitable memory devices, such as database 105. Example parameters and/or preferences that may be utilized in various embodiments of the invention include, but are not limited to, parameters associated with a rebate arrangement, parameters associated with market conditions of a drug, group of drugs, or class of drugs, parameters associated with the market share of a drug, group of drugs, or class of drugs, parameters associated with market share shift for a drug, group of drugs, or class of drugs, etc. Various parameters, such as market share or market share shifts, may be examined in any geographical area as desired, for example, in a state, in a region, in a country, etc. Additionally, various parameters, such as market share or market share shifts, may be identified, determined, and/or examined for specific groups of patients. A wide variety of different demographic criteria may be utilized as desired in various embodiments to identify or determine a group of patients, for example, location (e.g., zip code), gender, age, race, health condition, income level, etc. In certain embodiments, these parameters and/or preferences may include parameters and/or preferences that are received, selected, or otherwise identified by an entity that requests an audit or an entity on whose behalf an audit is conducted. For example, the parameters and/or preferences for auditing processed claim transactions may be identified by a drug manufacturer 104 or a payer 107.

At least a portion of the collected information associated with pharmaceutical claim transactions may be audited by the claim audit module 145. An audit may be conducted utilizing one or more parameters that are identified for the audit. A wide variety of different parameters may be utilized for an audit as desired in various embodiments of the invention. As one example, the parameters utilized for an audit may be parameters associated with a rebate arrangement that has been established between a drug manufacturer 104 and a payer 107. In this regard, the relevant terms and/or conditions from a rebate arrangement (e.g., pricing and drug offerings) may be compared to pharmaceutical claim transactions that are adjudicated by a payer 107. It may be determined from the audits whether or not the terms and/or conditions associated with the rebate arrangement are being adhered to by the payer 107. As another example, the parameters utilized for an audit may include parameters associated with one or more market conditions, such as market share, market trends, etc. In this regard, the market for one or more drugs (or other products and/or services) may be monitored in real time or near real time. Based at least in part on this auditing, a drug manufacturer 104 may evaluate products and/or rebate arrangements associated with the products. The claim audit module 145 may additionally generate a wide variety of reports associated with claim audits that may be communicated to the drug manufacturer 104 and/or the payers 107.

In certain embodiments of the invention, the rebate marketplace aggregator 102 or, alternatively, a system or entity associated with the rebate marketplace aggregator 102 (e.g., a pharmacy claims switch managed by RelayHealth) may operate as a switch provider for processing healthcare claim transactions, including pharmaceutical claim transactions. These claim transactions may be filed by a variety of different healthcare providers (e.g., pharmacies, hospitals, doctor's offices, etc.) for payment by a payer 107. For example, these claim transactions may be filed at a pharmacy point-of-service device 110. As shown in FIG. 1, a pharmacy POS device 110 may be in communication with the rebate marketplace aggregator 102 and/or with a switch provider (not shown) associated with the rebate marketplace aggregator 102 via one or more networks 106. The pharmacy POS device 110 may be configured for receiving prescription claim data, creating claim reimbursement transactions therefrom and transmitting said claim reimbursement transactions to the rebate marketplace aggregator 102. Prescription claim data may include any data that is typically provided by a patient, pharmacist and/or other health care provider in relation to filling a prescription (e.g., cost associated with filling the prescription, etc.) and/or requesting approval or authorization for payment from a payer 107. In example embodiments of the invention, the pharmacy POS device 110 may be a computer software program installed on a computer, a webpage, or a dedicated kiosk. Prescription claim data may be input to the pharmacy POS device 110 by a pharmacist or other health care provider or may be received by the pharmacy POS device 110 in electronic form from an electronic prescription service (not shown). The pharmacy POS device 110 may be configured for handling other types of prescription transactions.

Prescription claim transactions may be electronic records or messages intended to facilitate the communication of prescription information. For example, prescription claim transactions may be intended to communicate prescription claim data between pharmacies (i.e., providers) and payers 107. The content and format of a prescription claim may vary depending on which standard or protocol is used. In general, however, prescription claim transactions will identify the intended payer recipient, the drug product to be dispensed or previously dispensed, e.g., by National Drug Code ("NDC") number, the quantity to be dispensed as well as the days supply, whether the prescription claim relates to a new prescription or a refill prescription, and billing-related information. The billing-related information may include information associated with whether the drug is a preferred drug of the payer and/or information associated with a co-payment for the drug Prescription claim transactions may be transmitted from the pharmacy POS device 110 to the rebate marketplace aggregator 102 in batch, real-time or near real-time. The rebate marketplace aggregator 102 or other switch may then pass the claims on to one or more payer systems 108 associated with the appropriate payer 107. The payer systems 108 may include claims processing functionality and/or claims processing modules that adjudicate received claims on behalf of the payer 107. Pharmacy POS devices 110 can connect to the rebate marketplace aggregator 102 through a variety of methods, including dial-up, frame relay or leased-line. The entire system may be supported by redundant software, communications links, and uninterruptible power supplies, thereby ensuring that all connections will provide reliable, continuous operation. The system also may ensure that all of provider-submitted claims transactions are routed quickly, accurately, and consistently. In this regard, the costs of submitting claims may be reduced and the payers' or providers' payment cycles may be sped up.

In certain embodiments, the rebate marketplace aggregator 102 or an associated system may serve as a clearinghouse for multiple payer systems 108. Payer systems 108 may include systems operated by payers 107, such as insurance companies, financial institutions and other financial service providers. In its capacity as a clearinghouse, the rebate marketplace aggregator 102 is operable to parse prescription claim transactions and forward them to the appropriate payer system 108 for processing. Approval, authorization or rejection messages may be returned to the rebate marketplace aggregator 102 from the payer systems 108 and such messages may be forwarded by the rebate marketplace aggregator 102 to the pharmacy POS device 110.

In serving as a clearinghouse, the rebate marketplace aggregator 102 and/or the claim audit module 145 may also be configured for auditing the claim transactions to determine whether or not the payers 107 are adhering to the terms and/or conditions associated with a rebate offer provided by a drug manufacturer 104. Audits may also be conducted to evaluate a wide variety of different market parameters. The rebate marketplace aggregator 102 may receive permission from payers 107 to audit claim transactions prior to conducting an audit. For example, permission may be received when a payer 107 enrolls with the rebate marketplace aggregator 102. Additionally, audits may be conducted in real time or near real time as audit requests are received and/or as claim transactions or groups of claim transactions are routed by the rebate marketplace aggregator 102. In this regard, audits may be conducted in a timely and efficient manner, thereby facilitating prompt action by drug manufacturers 104 and/or payers 107 based at least in part on the results of the audits.

In accordance with an example embodiment of the invention, the rebate marketplace aggregator 102, and more particularly, the claim audit module 145, may be configured for performing certain claim parsing and reporting associated with a particular claim transaction or group of claim transactions. An example of a process conducted by the claim audit module 145 in accordance with the invention is described in further detail below with reference to FIG. 5. Claim transactions may be monitored and certain information, such as drug information and billing-related information, may be identified and/or stored by the claim audit module 145. The claim audit module 145 may then compare the identified information to the terms and/or conditions of a rebate arrangement. In this regard, the claim audit module 145 may validate whether the terms and/or conditions of a rebate arrangement are met or satisfied. Reporting information and/or applicable data files associated with the audit may then be communicated to the payer 107 and/or to the drug manufacturer 104.

Additionally, in accordance with an example embodiment of the invention, the provider of the rebate marketplace aggregator 102 may receive a portion of a rebate as payment for the services provided to the drug manufacturer 104 and the payer 107. Alternatively, the provider of the rebate marketplace aggregator 102 may receive a fee based on the number of rebate offers that exist for a drug manufacturer 104, for a payer 107, and/or between a particular drug manufacturer 104 and payer 107. As another alternative, the provider of the rebate marketplace aggregator 102 may receive predetermined fees from enrolled drug manufacturers 104 and/or payers 107, such as monthly fees or yearly fees.

Referring again to FIG. 1, it will be appreciated that the pharmacy POS device 110 may be any processor-driven device, such as a personal computer, laptop computer, handheld computer and the like. In addition to a processor 111, the pharmacy POS device 110 may further include a memory 112, input/output ("I/O") interface(s) 114, and a network interface 116. The memory 112 may store data files 118 and various program modules, such as an operating system ("OS") 120 and a practice management module 122. The practice management module 122 may comprise computer-executable instructions for performing various routines, such as those for creating and submitting prescription claim transactions. I/O interface(s) 114 may facilitate communication between the processor 110 and various I/O devices, such as a keyboard, mouse, printer, microphone, speaker, monitor, etc. The network interface 116 may take any of a number of forms, such as a network interface card, a modem, etc. These and other components of the pharmacy POS device 110 will be apparent to those of ordinary skill in the art and are therefore not discussed in more detail herein.

In addition to receiving and storing information rebate offers from drug manufacturers 104 and/or in addition to receiving and storing information associated with claim transactions that are routed by the rebate marketplace aggregator 102 or an associated switch provider, information associated with rebate offers and/or claim transactions may be received from a wide variety of different third party data sources 150. The information received from the one or more third party data sources 150 may be utilized to facilitate the establishment of rebate arrangements and/or in one or more audits conducted by the claim audit module 145. A wide variety of different entities, devices, systems, and/or data repositories may function as third party data sources 150 in various embodiments of the invention. Examples of third party data sources 150 include switch providers, data repositories associated with drug manufacturers 104 and/or rebate concatenators, data repositories associated with pharmacies, hospitals, and/or other healthcare service providers that submit claims for processing, and/or data repositories associated with payers (e.g., prescription benefit managers, insurance companies, healthcare coverage companies). In this regard, information associated with rebate offers and/or claim transactions may be collected or otherwise obtained by the rebate marketplace aggregator 102 and/or the claim audit module 145. For example, information may be collected for claim transactions that are routed by another switch provider or submitted to a payer on a paper claim form by a beneficiary or patient. As another example, information may be collected for cash transactions.

Each of the third party data sources 150 may include a processor 151, a memory 152, input/output ("I/O") interface(s) 153, and one or more network interfaces 154. The memory 152 may store data files 155 and various program modules, such as an operating system ("OS") 156, a database management system (DBMS) 157, and a host module 158. The host module 158 may receive and process requests for information associated with rebate offers and/or pharmaceutical claim transactions. In one embodiment, requests for information may be received from the rebate marketplace aggregator 102 and/or the claim audit module 145. Each of the third party data sources 150 may utilize information included in a request, such as drug manufacturer or patient identification information, to access one or more suitable memory devices and/or data repositories, such as database 160. The requested information may then be communicated to a requesting entity by a third party data source 150. In one embodiment, requests for information may be received from the rebate marketplace aggregator 102 and/or from the claim audit module 145. In this regard, the rebate marketplace aggregator 102 and/or the claim audit module 145 may supplement any information retrieved from the one or more databases 105 associated with the rebate marketplace aggregator 102 and/or the claim audit module 145. For example, requests for pharmaceutical claim transaction information may be communicated from the rebate marketplace aggregator 102 and/or the claim audit module 145 to the various third party data sources 150 during an audit, during the process of an audit request received from a drug manufacturer 104 or payer 107 or, alternatively, at predetermined time intervals, such as once an hour, once a day, etc.

The one or more suitable networks 106 may comprise any number of telecommunication and/or data networks, whether public or private, such as a local area network, a wide area network, an intranet, an internet and/or any combination thereof and may be wired and/or wireless. Due to network connectivity, various methodologies as described herein may be practiced in the context of distributed computing environments. Although the pharmacy POS device 110, payers 107, and drug manufacturers 104 are shown for simplicity as being in communication with the rebate marketplace aggregator 102 via one intervening network 106, it is to be understood that any other network configuration is possible. For example, the pharmacy POS device 110 may be connected to a pharmacy's local or wide area network, which may include other devices, such as gateways and routers, for interfacing with another public or private network 106. Instead of or in addition to a network 106, dedicated communication links may be used to connect the various devices of the example embodiment of the invention.

Those skilled in the art will appreciate that the operating environment shown in and described with respect to FIG. 1 is provided by way of example only. Numerous other operating environments, system architectures and device configurations are possible. For example, the invention may in certain embodiments be implemented in a non-networked environment. Accordingly, the example embodiment of the invention should not be construed as being limited to any particular operating environment, system architecture or device configuration.

Using the rebate marketplace aggregator 102, drug manufacturers 104 and payers 107 may enter into rebate arrangements with relatively minimal effort on the part of the manufacturers 104 and payers 107. Additionally, claim transactions may be audited to ensure that terms and/or conditions associated with a rebate arrangement are satisfied. Thus, the rebate marketplace aggregator 102 can streamline the process of entering into and managing rebate arrangements.

FIG. 2 is a flowchart showing one example method 200 for facilitating the establishment of a pharmaceutical rebate arrangement at a rebate marketplace aggregator, such as the rebate marketplace aggregator 102, according to an illustrative embodiment of the invention. The method may begin at block 205. At block 205, rebate offers may be received from one or more drug manufacturers, such as drug manufacturers 104. Rebate offers may be received utilizing a wide variety of different methods and/or technique, including, but not limited to, those described above with reference to FIG. 1. For example, rebate offers may be electronically received from a drug manufacturer 104 that is enrolled with the rebate marketplace aggregator 102. As another example, rebate offers may be received via conventional methods, such as via snail mail.

Once one or more rebate offers have been received from one or more drug manufacturers 104 at block 205, operations may continue at block 210. At block 210, a request may be received from a payer, such as payer 107, for information associated with one or more available rebate offers. In certain embodiments, the payer 107 may search for available rebate offers in accordance with a wide variety of different search terms, such as a therapeutic classification or an identifier of a drug manufacturer.

At block 215, information associated with one or more available rebate offers may be presented to the payer 107 in response to the request received at block 210. The information may be presented to the payer 107 in accordance with any number of suitable presentment methods and/or techniques. In one embodiment, the information associated with rebate offers may be presented to the payer 107 via a suitable web page or web interface that is generated by a web server or host module associated with the rebate marketplace aggregator 102. In another embodiment, the information associated with the rebate offers may be emailed to the payer 107 by the rebate marketplace aggregator 102. Additionally, the presented information may be formatted in a wide variety of different ways as desired in various embodiments of the invention. One example of formatting the presented information is described below with reference to FIG. 9.

At block 220, a payer selection of an available rebate offer may be received. The payer selection may be received in accordance with a wide variety of suitable methods and/or techniques. For example, in one embodiment, a payer selection may be received via input entered into a web page hosted by the rebate marketplace aggregator 102. In other example embodiments, a payer selection may be received via email or via one or more conventional methods, such as via snail mail.

At blocks 225-235, which may be optional in various embodiments of the invention, the rebate marketplace aggregator 102 may facilitate the negotiation of one or more alternate terms and conditions for a rebate offer. In other words, the rebate marketplace aggregator 102 may facilitate the making of counteroffers by the payer 107. At block 225, a determination may be made as to whether one or more alternate terms and/or conditions are requested by the payer 107. If it is determined at block 225 that one or more alternate terms and/or conditions are not requested, then operations may continue at block 240. However, if it is determined at block 225 that one or more alternate terms and/or conditions are requested by the payer 107, then operations may continue at block 230 and the one or more alternate terms and/or conditions may be received by the rebate marketplace aggregator 102 from the payer 107. The rebate marketplace aggregator 102 may then communicate the one or more alternate terms and/or conditions to the drug manufacturer 104 for consideration. In certain embodiments, the alternate terms and/or conditions may be screened by the rebate marketplace aggregator 102 in accordance with preferences associated with the drug manufacturer 104 prior to communicating the alternate terms and/or conditions to the drug manufacturer 104. In this regard, counteroffers that will not be considered by the drug manufacturer 104 may be screened out.

At block 235, the rebate marketplace aggregator 102 may receive a response to the alternate terms and/or conditions from the drug manufacturer 104. The response may be an acceptance of the alternate terms and/or conditions, a denial of the alternate terms and/or conditions, or new terms and/or conditions offered by the drug manufacturer (e.g., a new counteroffer). The rebate marketplace aggregator 102 may communicate the response received from the drug manufacturer 104 to the payer 107. The operations described in blocks 225-235 may be repeated until an agreement on a rebate arrangement is reached by the drug manufacturer 104 and the payer 107. Once an agreement is reached, operations may continue at block 240.

Although the negotiation of terms and/or conditions for a rebate arrangement are described as being routed through the rebate marketplace aggregator 102, in certain embodiments of the invention, the rebate marketplace aggregator 102 may facilitate the establishment of a direct connection between the drug manufacturer 104 and a payer 107. Negotiations may then be conducted directly between the drug manufacturer 104 and the payer 107. Once an agreement is reached, the terms and/or conditions associated with the agreement may be communicated to the rebate marketplace aggregator 102.

At block 240, the rebate marketplace aggregator 102 may facilitate the establishment of a rebate arrangement or rebate agreement between the drug manufacturer 104 and the payer 107. In certain embodiments, the rebate marketplace aggregator 102 may facilitate the enrollment of the payer 107 into a rebate arrangement offered by the drug manufacturer 104. In some example embodiments, an indication may be communicated to the drug manufacturer 104 that the payer 107 wishes to accept a rebate offer, and the drug manufacturer 104 may enroll the payer 107 into a rebate arrangement. In other example embodiments, the rebate marketplace aggregator 102 may enroll the payer 107 into a rebate arrangement and send an appropriate indication of enrollment to the drug manufacturer 104 and/or to the payer 107.

Once a rebate arrangement or rebate agreement has been established, then at block 245 information associated with the established rebate arrangement or rebate agreement may be stored by the rebate marketplace aggregator 102 in one or more suitable memory devices, such as in database 105 shown in FIG. 1. The rebate marketplace aggregator 102 may then monitor and/or audit the established rebate arrangement as desired in various embodiments of the invention.

The method 200 may end following block 245.

FIG. 3 is a flowchart showing one example method 300 for drug manufacturers, such as drug manufacturers 104, to communicate rebate offers to a rebate marketplace aggregator, such as the rebate marketplace aggregator 102, according to an illustrative embodiment of the invention. Once the method 300 starts, operations may commence at block 305. At block 305, a drug manufacturer 104 may sign-in or log-in to an application provided by the rebate marketplace aggregator 102, for example, a web hosted application. Log-in and/or security information may be communicated from the drug manufacturer 104 to the rebate marketplace aggregator 102 during the sign-in process. Alternatively, if the drug manufacturer 104 has not previously enrolled with the rebate marketplace aggregator 102, then the drug manufacturer 104 may be enrolled as part of the sign-in process.

The application provided by the rebate marketplace aggregator 102 may be provided to the drug manufacturer 104 via any number of suitable networks, such as the Internet. In certain embodiments of the invention, the drug manufacturer 104 may access the rebate marketplace aggregator 102 via a web browser application and the application provided by the rebate marketplace aggregator 102 may present various web pages to the drug manufacturer 104 that facilitate the gathering of rebate offer information. After the drug manufacturer 104 has signed on to the application provided by the rebate marketplace aggregator 102 at block 305, operations may continue at block 310.

At block 310, the drug manufacturer 104 may define various rebate offers and/or rebate arrangements that the drug manufacturer 104 is willing to offer to one or more payers of pharmaceutical claims. Once these rebate offers are identified at block 310, operations may continue at block 315, and the drug manufacturer 104 may specify various terms and/or conditions that are associated with one or more rebate offers. The drug manufacturer 104 may specify terms and/or conditions for individual drugs and/or for bundles or groups of drugs. For example, a certain rebate may be offered if a payer is willing to list multiple drugs of the drug manufacturer 104 as preferred drugs of the payer. As discussed above with reference to FIG. 1, a wide variety of different terms and/or conditions may be specified for a rebate offer. Following the specification of terms and/or conditions by the drug manufacturer 104 at block 315, operations may continue at block 320.

At block 320, the drug manufacturer 104 may review rebate offers and/or rebate arrangements that have been defined. Additionally, the drug manufacturer 104 may review the terms and/or conditions associated with those rebate offers. During the review process, the drug manufacturer 104 may determine that changes are needed for the rebate offers and/or for the terms and/or conditions, and the drug manufacturer 104 may edit this information. Once the information has been entered to the satisfaction of the drug manufacturer 104, operations may continue at block 325 and the drug manufacturer 104 may finalize and confirm the rebate offers or rebate arrangements. The drug manufacturer may also confirm the terms and/or conditions associated with the various rebate offers.

The method 300 may end following the confirmation and verification at block 325. At this point, rebate offers for the drug manufacturer 104 have been received by the rebate marketplace aggregator 102. The rebate marketplace aggregator 102 may store these rebate offers so that they can be presented to various payers, such as payers 107, as described in greater detail below with reference to FIG. 4. Additionally, the rebate marketplace aggregator 102 may communicate indications of various rebate offers, such as new rebate offers, to various payers 107 in order to invite payers to enroll for the rebates.

FIG. 4 is a flowchart showing one example method 400 for payers, such as payers 107, to select a rebate offer at a rebate marketplace aggregator, such as the rebate marketplace aggregator 102, in order to enter into a rebate arrangement with a drug manufacturer, such as drug manufacturer 104, according to an illustrative embodiment of the invention. Once the method 400 starts, operations may commence at block 405. At block 405, a payer 107 may sign-in or log-in to an application provided by the rebate marketplace aggregator 102. Log-in and/or security information may be communicated from the payer 107 to the rebate marketplace aggregator 102 during the sign-in process. Alternatively, if the payer 107 has not previously enrolled with the rebate marketplace aggregator 102, then the payer 107 may be enrolled as part of the sign-in process.

The application provided by the rebate marketplace aggregator 102 may be provided to the payer 107 via one or more suitable networks, such as the Internet. In certain embodiments of the invention, the payer 107 may access the rebate marketplace aggregator 102 via a web browser application and the application provided by the rebate marketplace aggregator 102 may present various web pages to the payer 107 that facilitate the gathering of rebate offer information. After the payer 107 has signed on to the application provided by the rebate marketplace aggregator 102 at block 405, operations may continue at block 410.

At block 410, the payer 107 may search for desired rebate offers or rebate arrangements. Various search criteria may be received from the payer 107 via a network, such as network 106, in order to search for desired rebate offers. For example, search criteria may be entered into a web page presented to the payer 107 by the rebate marketplace aggregator 102. A rebate module, such as rebate module 140, associated with the rebate marketplace aggregator 102 may then search for available rebate offers based at least in part on the received search criteria, and the results may be presented to and/or communicated to the payer 107. A payer 107 may enter a wide variety of different search criteria as desired in various embodiments of the invention. For example, a payer 107 may search for drugs by therapeutic class, by manufacturer, by a rebate amount, and/or by terms and/or conditions that are associated with rebates. These search criteria may be entered by the payer 107 into an appropriate search web page, such as the page described below with reference to FIG. 8 or, alternatively, these search criteria may be selected from pull down menus provided to the payer 107. Additionally, a payer 107 may indicate whether or not it desires bundle rebate opportunities to be presented. Once the payer 107 has searched for various rebate offers at block 410, operations may continue at block 415.

At block 415, a payer 107 may select one or more rebate offers, rebate arrangements, or bundles of rebate offers or arrangements. As part of the selection of a rebate offer or bundle of rebate offers, all of the terms and/or conditions associated with the offer or bundle may be presented to the payer 107 for review. Although not shown in FIG. 4, in certain embodiments of the invention, a payer 107 may propose a counteroffer for a rebate arrangement, as discussed above with reference to FIGS. 1 and 2. If a payer 107 is willing to accept all of the terms and/or conditions associated with a rebate offer, then the payer 107 may opt to enroll for or sign-up for the rebate offer at block 415. Following this selection at block 415, operations may continue at block 420.

At block 420, a payer 107 may review any selected rebate offers or rebate arrangements. The payer 107 may also review the terms and/or conditions associated with selected rebate offers or rebate arrangements. If the rebate offers or rebate arrangements are satisfactory to the payer 107, then operations may continue at block 425 and the payer 107 may finalize and confirm the selection of a rebate offers or rebate arrangement. At this point, the payer 107 may be enrolled for the rebate offer. The rebate marketplace aggregator 102 may store an indication of the rebate offers that the payer 107 has enrolled for in one or more suitable memory devices, such as in a database 105.

The method 400 may end following the confirmation and verification at block 425. At this point, the payer 107 may be enrolled for rebate offers for various drug manufacturers 104, and indications of this enrollment may be stored by the rebate marketplace aggregator 102. The rebate marketplace aggregator 102 may store these rebate arrangements for future use in claim transaction auditing, as discussed in greater detail below with reference to FIG. 5. Additionally, the rebate marketplace aggregator 102 may communicate indications of the rebate offers that a payer 107 has enrolled for to the various drug manufacturers 104 that are involved.

In various embodiments of the invention, collected information associated with pharmaceutical claim transactions may be audited. A wide variety of different audits may be conducted, including audits that relate to rebate agreements that have been established between drug manufacturers, such as drug manufacturers 104, and payers, such as payers 107. FIG. 5 is a flowchart showing one example method 500 for auditing claim transactions, according to an illustrative embodiment of the invention. In certain embodiments, the method 500 may be carried out by a rebate module, such as rebate module 140, associated with a rebate marketplace aggregator, such as the rebate marketplace aggregator 102, or with one or more associated systems acting as a switch for claim transaction processing. The claim auditing may be utilized to determine whether a payer is satisfying the terms and/or conditions associated with various rebate offers.

The method 500 may commence at block 505. At block 505, information associated with claim transactions, such as drug information and billing information, may be received and monitored by the rebate marketplace aggregator 102. Information associated with claim transactions may be collected in real time or near real time during the routing and/or processing of pharmaceutical claim transactions. Additionally or alternatively, information associated with claim transactions may be collected from one or more third party data sources, such as third party data sources 150. A claim audit module, such as claim audit module 145, associated with the rebate marketplace aggregator 102, may parse the claim transactions information in order to identify information that is relevant to the claim auditing. This relevant information may be stored by the rebate marketplace aggregator 102 and/or the claim audit module 145. Once the relevant information has been identified, operations may continue at block 510.

At block 510, a portion or all of the relevant information from the claim transactions may be compared to the terms and/or conditions associated with various rebate agreements. For example, a rebate agreement may specify that only a particular drug may be offered by a payer as a preferred drug within a therapeutic class, and the rebate agreement may further specify that a predefined minimum co-payment difference be provided for preferred drugs and non-preferred drugs within a class. Claim transaction information may be received for any number of claims for the payer. The claim transaction information may be analyzed in order to verify that only the particular drug is treated as a preferred drug by the payer within the class and to verify that the specified co-payment difference is adhered to by the payer. It will be appreciated that a wide variety of terms and/or conditions may be associated with a rebate arrangement and, therefore, that a wide variety of comparisons may be conducted as desired in various embodiments of the invention. Following the comparison of claim transaction information to rebate terms and/or conditions at block 510, operations may continue at block 515.

At block 515, a validation that the terms and/or conditions are being adhered to may be conducted. If the terms and/or conditions are not being adhered to, appropriate messages or other indications may be communicated to the relevant drug manufacturers 104 and/or payers 107. Following the validation of the terms and/or conditions at block 515, various reports and/or other data files may be generated at blocks 520 and 525 for the drug manufacturers 104 and the payers 107 respectively.

At block 520, various reports and/or data files may be generated or prepared for applicable drug manufacturers 104. Similarly, at block 525, various reports and/or data files may be generated or prepared for applicable payers 107. The generated reports may include a wide variety of information as desired in various embodiments of the invention. For example, the generated reports may include information associated with processed claims, summary reports of processed claims, information associated with a number of claims that qualify for a particular rebate arrangement, information associated with a rebate amount associated with each qualifying claim, information associated with a total rebate amount, information associated with satisfied terms and/or conditions, information associated with unsatisfied terms and/or conditions, information associated with the market share of particular drugs or groups of drugs, and/or demographic information associated with the utilization or usage of particular drugs or groups of drugs. Analyzed demographic information may include, for example, geographical areas of sales (e.g., regions, states, cities, zip codes, etc.), ages of patients, gender of patient, health conditions of patients, types of insurance coverage or other healthcare benefits of patients, etc.

Following the generation of the various reports and/or data files at blocks 520 and 525, operations may continue at blocks 530 and 535. At block 530, the generated reports and/or data files for the drug manufacturers 104 may be delivered to or otherwise communicated to the drug manufacturers 104. Similarly, at block 535, the generated reports and/or data files for the payers may be delivered to or otherwise communicated to the payers 107. The communication of reports and/or data files may accomplished by a wide variety of different methods, including the electronic communication of the reports and/or files via a suitable network, such as network 106 and/or the mailing or shipping of hard copy information, diskettes, CD-ROMs, and/or other portable memory devices to the recipient.

The method 500 may end following the delivery of reports at blocks 530 and 535.

In certain embodiments of the invention, information associated with pharmaceutical claim transactions may be collected during the routing and/or processing of the pharmaceutical claim transactions. FIG. 6 illustrates an example block diagram 600 for collecting information associated with pharmaceutical claim transactions, according to an illustrative embodiment of the invention. The diagram 600 illustrates one example for collecting information associated with claims that are routed and/or processed by a switch provider included as a component of or otherwise associated with a rebate marketplace aggregator, such as rebate marketplace aggregator 102. In this regard, information associated with the claim transactions may be collected in real time or near real time for auditing purposes.

With reference to FIG. 6, a pharmacy POS device, such as pharmacy POS device 110 shown in FIG. 1, may transmit or otherwise communicate a claim request 605 on behalf of a customer to a rebate marketplace aggregator (or an associated switch provider), such as rebate marketplace aggregator 102 shown in FIG. 1. The claim request 605 may include a wide variety of different information associated with a pharmacy claim as desired in various embodiments of the invention. The rebate marketplace aggregator 102 may receive the claim request 605 and route the claim request 605 to an appropriate payer system, such as payer system 108, for further processing and/or adjudication. According to an example embodiment, the rebate marketplace aggregator 102 may utilize a BIN/PCN in the received claim request 605 to determine the appropriate payer system 108 to route the claim request 605 to. The rebate marketplace aggregator 102 may also include a routing table, perhaps stored in memory, such as memory 128, for determining which payer system 108 to route the claim request 605 to. According to an example embodiment of the invention, the payer system 108 may be any pharmacy claims processing system associated with a payer 107, such as a pharmacy benefits manager (e.g., a pharmacy benefits manager (PBM)), an insurance company, or a government payor (e.g., Medicare, Medicaid). Alternatively, the payer system 108 may be a discount program processing system associated with a discount payer, including a discount program where a customer is responsible for paying for a portion or entire cost of the drug.

The payer system 108 may receive and adjudicate the claim request 605. In particular, the payer system 108 may determine benefits coverage for the received claim request 605 according to an adjudication process associated with eligibility, pricing, and/or utilization review. According to an example embodiment of the invention, the adjudication process may include determining a covered amount such as an insured amount, a customer amount such as a co-pay amount, co-insurance amount or other patient payment amount, and/or an anticipated rebate amount associated with a claim. The payer system 108 may transmit an adjudicated claim 610 to the rebate marketplace aggregator 102. If the drug is covered, at least in part, by a payer 107 associated with the payer system 108, then the adjudicated claim 610 may include the covered amount, the customer amount, a the rebate amount, and/or any suitable formulary messaging. On the other hand, if the drug is not covered by the payor 107, then the adjudicated claim 610 may include a rejected claim notice indicating that the drug is not covered by the payer 107 along with an appropriate reason for the rejection. The adjudicated claim 610 may also include some or all of the information included in the claim request 605, discussed herein. The rebate marketplace aggregator 102 may receive the adjudicated claim 610 from the payer system 108 and then route the adjudicated claim 610 back to the pharmacy POS device 110. At a pharmacy or other healthcare provider associated with the pharmacy POS device 110, the patient will then be responsible for any customer amount (e.g., co-pay, co-insurance, or other patient payment amount) indicated by the adjudicated claim 610.

In addition to routing the claim request 605 and the adjudicated claim 610, the rebate marketplace aggregator 102 may also capture and/or store information associated with the claim request 605 and/or the adjudicated claim 610. The information may be stored in one or more records 615 in a suitable memory device or data repository associated with the rebate marketplace aggregator 102, such as in database 105 shown in FIG. 1. In various embodiments of the invention, any number of records 615 may be stored in the database 105. Additionally, each record 615 may include a wide variety of information as desired in various embodiments of the invention including, but not limited to, the information discussed above with reference to FIG. 1. In this regard, information associated with pharmacy claim transactions may be stored by a rebate marketplace aggregator 102 or an associated switch provider that routes the claims. In certain embodiments of the invention, the information may be stored in real time, near real time or approximately in real time as the claims are routed by the rebate marketplace aggregator 102.

FIG. 7 is a flowchart showing one example method 700 for collecting information associated with pharmaceutical claim transactions, according to an illustrative embodiment of the invention. The method 700 may be utilized to collect information associated with pharmaceutical claims as the pharmaceutical claims are routed and/or processed by a rebate marketplace aggregator, such as, rebate marketplace aggregator 102, or by a switch provider associated with the rebate marketplace aggregator 102. In this regard, the information associated with the pharmaceutical claim transactions may be collected in real time or near real time as the claims are routed, processed, and/or adjudicated. Audits may then be conducted on the collected claim information in real time or near real time as the information is collected.

The method 700 may begin at block 705. At block 705, a pharmacy POS device, such as pharmacy POS device 110, may transmit or otherwise communicate a claim request, such as claim request 605, to the rebate marketplace aggregator 102. At block 710, which may be optional in some embodiments of the invention, the rebate marketplace aggregator 102 may store information associated with the received claim request 605 in one or more suitable memories or data repositories, such as database 105. Information associated with the claim request 605 may be stored in the database 105 in real time, near real time, or approximately in real time as the claim request 605 is processed by the rebate marketplace aggregator 102. Alternatively, information associated with the claim request 605 may be stored in one or more local memories (e.g., a cache or a random access memory) associated with the rebate marketplace aggregator 102 during the processing of the claim request 605, and the information may later be written to the database 105. The information may be written to the database 105 from the one or more local memories in real time or near real time, following the adjudication of the claim, and/or at a predetermined time interval, such as once every minute, once every 15 minutes, once every hour, etc.

At block 715, the rebate marketplace aggregator 102 may route the claim request 605 to a payer, such as payer 107, for adjudication. At block 720, the claim request 605 may be adjudicated by the payer 107 and an adjudicated claim, such as adjudicated claim 610, may be transmitted or otherwise communicated to the rebate marketplace aggregator 102 by the payer 107.

At block 725, the rebate marketplace aggregator 102 may store information associated with the claim request 605 and/or the adjudicated claim 610 in one or more suitable memories or data repositories, such as, database 105. Information associated with the claim request 605 and/or the adjudicated claim 610 may be stored in the database 105 in real time, near real time, or approximately in real time as the adjudicated claim 610 is processed by the rebate marketplace aggregator 102. Alternatively, information associated with the claim request 605 and/or adjudicated claim 610 may be stored in one or more local memories (e.g., a cache or a random access memory) associated with the rebate marketplace aggregator 102 during the processing of the claim request 605 and/or the adjudicated claim 610, and the information may later be written to the database 105. The information may be written to the database 105 from the one or more local memories in real time or near real time, following the adjudication of the claim, and/or at a predetermined time interval, such as, once every minute, once every 15 minutes, once every hour, etc. In this regard, information associated with claim requests and/or adjudicated claims that are processed by the rebate marketplace aggregator 102 may be stored in the database 105 for subsequent retrieval in the processing of claim audits.

At block 730, the rebate marketplace aggregator 102 may route the adjudicated claim 610 to the pharmacy POS device 110. The method 700 may end following block 730.

The operations set forth in the flowcharts described above may be performed in any suitable order as desired in various embodiments of the invention. Additionally, in certain embodiments of the invention, less than or more than the operations set forth in the flowcharts may be performed. It will be appreciated that the operations set forth in the flowcharts and described herein are provided by way of example only.

In certain embodiments of the invention, various graphical user interfaces may be provided to drug manufacturers and/or payees as desired. In some embodiments, these graphical user interfaces may be provided as web pages. A wide variety of different graphical user interfaces may be provided as desired in embodiments of the invention. A few potential graphical user interfaces are describes below by way of example only. These example interfaces relate to searching for rebate offers by a drug manufacturer.

FIG. 8 shows one example of a graphical user interface 800 that may facilitate searching for rebate offers, according to an illustrative embodiment of the invention. As shown in FIG. 8, the graphical user interface 800 may include identifying information for a rebate marketplace aggregator, such as rebate marketplace aggregator 102, and/or for a payer, such as payer 107 in section 805. The identifying information for the rebate marketplace aggregator 102 may identify a service provider that maintains the rebate marketplace aggregator 102, such as RelayHealth. The identifying information for the payer 107 may identify, for example, a user number of the payer 107 with the rebate marketplace aggregator 102, a name of the payer 107, and/or a plan that the payer 107 is enrolled with at the rebate marketplace aggregator 102. In certain embodiments of the invention, various payers may be enrolled in different plans based at least in part on demographic data and/or financial data associated with the payer. In this regard, different rebate offers may be provided for different geographic area and/or for different sizes of payers.

Additionally, the graphical user interface 800 may include an indication of the steps for enrolling for a rebate offer in section 810. As shown in FIG. 8, these steps may include searching for available rebate offers, selecting one or more rebate offers, reviewing selected rebate offers, and confirming enrollment in selected rebate offers. Although not shown, a step may also be provided for negotiating the terms and/or conditions of various rebate offers. In certain embodiments of the invention, the current step may be indicated in the graphical user interface 800.

Search criteria are also provided in the graphical user interface 800. A wide variety of different search criteria may be utilized, such as a therapeutic class criteria 815 and/or a drug manufacturer criteria 820. Search terms may be manually entered for one or more of the search criteria or, alternatively, search terms may be selected using pull down menus, such as menus 825 and 830. With specific reference to FIG. 8, pull down menu 825 may be provided in order to facilitate the selection of a therapy class or therapeutic class, and pull down menu 830 may be provided in order to facilitate the selection of a drug manufacturer. Additionally, a selection box 835 may be provided that permits a payer to search for various rebate bundles associated with a particular search.

A search button 840 may also be provided. Selection of the search button 840 may commence a search. If search terms have been entered into the graphical user interface 800, then the search will be conducted in association with the entered search terms. However, if no search terms are entered, then all rebate offers available to the payer 107 may be returned for the search. Alternatively, the payer 107 may be prompted to enter one or more search terms.

FIG. 9 shows one example of a graphical user interface 900 that facilitates the display of rebate offers as the result of a search, according to an illustrative embodiment of the invention. As shown in FIG. 9, the graphical user interface 900 may include in section 905 identifying information for a rebate marketplace aggregator, such as rebate marketplace aggregator 102, and/or for a payer, such as payer 107. This identifying information 905 may be similar to the identifying information 805 described above with reference to FIG. 8. Additionally, the graphical user interface 900 may include an indication of the steps for enrolling for a rebate offer in section 910. This indication may also be similar to that described above with reference to FIG. 8.

With continued reference to FIG. 9, the graphical user interface 900 may additionally include an indication of the search terms that were in a search in section 915. As shown, a search has been conducted for therapy class ABC. Search results may also be provided in the graphical user interface 900. Four search results 920, 925, 930, and 935 are illustrated in FIG. 9; however, any number of search results may be provided for display in the graphical user interface.

For each of the search results 920, 925, 930, and 935, various terms and conditions for the applicable rebate offer may be displayed in association with the respective search result 920, 925, 930, or 935. For example, a first search result 920 may include terms and/or conditions for a first rebate offer associated with Drug A that is manufactured by manufacturer ABC. As shown, a rebate of a certain amount may be provided if the drug is offered by a payer 107 as one of two preferred drugs within the therapeutic class and if a co-payment differential of a certain amount is provided between preferred and non-preferred drugs within the therapeutic class. As another example, a second search result 925 may include terms and/or conditions for a second rebate offer associated with Drug A. For example, a different rebate amount may be provided if Drug A is offered by the payer 107 as the only preferred drug within the therapeutic class. Other example search results 930 and 935 are shown in FIG. 9 for Drug B. In certain embodiments of the invention, a payer 107 may select a particular search result, for example, by selecting a hypertext link associated with the search result, and the payer 107 may be presented a more detailed display of the terms and/or conditions associated with the search result.

For each of the search results 920, 925, 930, and 935, a respective selection button 921, 926, 931, and 936 may be provided. Selection of one or more selection buttons 921, 926, 931, or 936 by the payer 107 may indicate the rebate offers that the payer 107 wishes to enroll for. In certain embodiments of the invention, the payer 107 may be prevented from selecting multiple rebate offers that conflict with one another. For example, if the payer 107 selected the second search result 925 by selecting button 926, then the payer 107 may be prevented from selecting any other search results in the therapeutic class without first deselecting the second search result 925. Alternatively, the selection of another search result may automatically cause the de-selection of the second search result 925.

With continued reference to FIG. 9, multiple pages of search results may be provided to the payer 107, and the payer 107 may select a search result page using page indicators 940. Additionally or alternatively, a greater number of search results may be provided on a particular page and appropriate scroll bars may be provided in order to review all of the search results.

Additionally, a payer 107 may select a search button 945 in order to conduct another search for rebate offers. Selection of a clear button 950 may clear all of the displayed search results, selected search results, unselected search results, or the search results displayed on a particular page. Selection of the finish button 955 may initiate a review and confirmation process of selected rebate offers.

The invention is described above with reference to block diagrams and flowchart illustrations of systems, methods, apparatuses and computer program products according to embodiments of the invention. It will be understood that each block of the block diagrams, and combinations of blocks in the block diagrams, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functionality of each block of the block diagrams, or combinations of blocks in the block diagrams discussed in detail in the descriptions above.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the block or blocks.

Accordingly, blocks of the block diagrams and flowchart illustrations support combinations of means for performing the specified functions, combinations of elements or steps for performing the specified functions and program instruction means for performing the specified functions. It will also be understood that each block of the block diagrams, and combinations of blocks in the block diagrams, can be implemented by special purpose hardware-based computer systems that perform the specified functions, elements or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

That which is claimed:

1. A computer-implemented method for facilitating the establishment of pharmaceutical rebate agreements, the method comprising:
receiving, from a plurality of drug manufacturers by a rebate marketplace aggregator system comprising one or more computers, information associated with a plurality of available rebate offers, each rebate offer associated with one or more pharmaceutical products manufactured by one of the plurality of drug manufacturers, the received information for each rebate offer comprising one or more respective conditions established by a relevant drug manufacturer for receiving rebates in association with the rebate offer;
electronically presenting, by the rebate marketplace aggregator system, at least a portion of the plurality of rebate offers to a payer of pharmaceutical benefits; and
receiving, by the rebate marketplace aggregator system from the payer, a selection of at least one presented rebate offer; and
facilitating, by the rebate marketplace aggregator system based at least in put upon the received selection, an enrollment of the payer for the at least one selected rebate offer.

2. The method of claim 1, further comprising:
receiving, by the rebate marketplace aggregator system from the payer, one or more search criteria associated with available rebate offers; and
identifying, by the rebate marketplace aggregator system, the at least a portion of the plurality of rebate offers for presentment based at least in part on the received one or more search criteria.

3. The method of claim 1, wherein the one or more respective conditions for one of the plurality of rebate offers comprise one or more of a condition associated with listing a pharmaceutical product as a preferred pharmaceutical product, a limitation on a number of pharmaceutical products that may be offered by the payer as preferred pharmaceutical products within a therapeutic class, or a condition associated with a co-payment differential between a preferred pharmaceutical product and one or more non-preferred pharmaceutical products.

4. The method of claim 1, further comprising:
collecting, by the rebate marketplace aggregator system subsequent to the enrollment of the payer for the at least one selected rebate offer, claim transaction information associated with one or more pharmaceutical claims made for services provided by the payer to its customers;
comparing, by the rebate marketplace aggregator system, at least a portion of the collected claim transaction information to the one or more conditions associated with the at least one selected rebate offer for which the payer is enrolled; and
determining, by the rebate marketplace aggregator system based at least in part on the comparison, whether the one or more conditions associated with the at least one selected rebate offer have been satisfied.

5. The method of claim 4, wherein collecting claim transaction information associated with one or more pharmaceutical claims made for services provided by the payer to its customers comprises collecting claim transaction information in real time or near real time as the one or more pharmaceutical claims are routed between the payer and a point of sale device.

6. The method of claim 4, further comprising:
generating, by the rebate marketplace aggregator system, one or more reports based at least in part on the determination of whether the one or more conditions associated with the at least one selected rebate offer have been satisfied; and
communicating, by the rebate marketplace aggregator system, the one or more generated reports to at least one of the drug manufacturer or the payer.

7. The method of claim 1, further comprising:
collecting, by the rebate marketplace aggregator system subsequent to the enrollment of the payer for the at least one selected rebate offer claim transaction information associated with one or more pharmaceutical claims made for services provided by the payer to its customers; and
electronically auditing, by the rebate marketplace aggregator system, at least a portion of the collected claim transaction information based at least in part on one or more audit parameters associated with at least one market condition for a pharmaceutical product.

8. A system operable to facilitate the establishment of pharmaceutical rebate agreements, the system comprising:
at least one memory operable to store information associated with a plurality of available rebate offers, each rebate offer associated with one or more pharmaceutical products manufactured by one of a plurality of drug manufacturers, the stored information for each rebate offer comprising one or more respective conditions established by a relevant drug manufacturer for receiving rebates in association with the rebate offer;
at least one communications interface operable to receive and transmit communications over one or more networks; and
at least one processor operable to:
receive, via the at least one communications interface, the information associated with the plurality of rebate offers;
direct presentation, via the at least one communications interface, of at least a portion of the plurality of rebate offers to a payer of pharmaceutical benefits; and
receive, via the at least one communications interface from the payer, a selection of at least one presented rebate offer; and
facilitate, based at least in part upon the received selection, enrollment of the payer for the at least one selected rebate offer.

9. The system of claim 8, wherein the at least one processor is further operable to:
receive, via the at least one communications interface from the payer, one or more search criteria associated with available rebate offers; and identify the at least a portion of the plurality of rebate offers for presentment based at least in part on the received one or more search criteria.

10. The system of claim 8, wherein the one or more respective conditions for one of the plurality of rebate offers comprise one or more of a condition associated with listing a pharmaceutical product as a preferred pharmaceutical product, a limitation on a number of pharmaceutical products that may be offered by the payer as preferred pharmaceutical products within a therapeutic class, or a condition associated with a co-payment differential between a preferred pharmaceutical product and one or more non-preferred pharmaceutical products.

11. The system of claim 8, wherein the at least one processor is further operable to:
collect, subsequent to the enrollment of the payer for the at least one selected rebate offer, claim transaction information associated with one or more pharmaceutical claims made for services provided by the payer to its customers;
compare at least a portion of the collected claim transaction information to the one or more conditions associated with the at least one selected rebate offer for which the payer is enrolled; and
determine, based at least in part on the comparison, whether the one or more conditions associated with the at least one selected rebate offer have been satisfied.

12. The system of claim 11, wherein the at least one processor is operable to collect claim transaction information associated with one or more pharmaceutical claims made for services provided by the payer to its customers in real time or near real time as the one or more pharmaceutical claims are routed between the payer and a point of sale device.

13. The system of claim 11, wherein the at least one processor is further operable to:
generate one or more reports based at least in part on the determination of whether the one or more conditions associated with the at least one selected rebate offer have been satisfied; and
direct communication, via the at least one communications interface, of the one or more generated reports to at least one of the drug manufacturer or the payer.

14. The system of claim 8, wherein the at least one processor is further operable to:
collect, subsequent to the enrollment of the payer for the at least one selected rebate offer, claim transaction information associated with one or more pharmaceutical claims made for services provided by the payer to its customers; and
electronically audit at least a portion of the collected claim transaction information based at least in part on one or more audit parameters associated with at least one market condition for a pharmaceutical product.

15. A computer-implement method for facilitating the establishment of pharmaceutical rebate arrangements, the method comprising:
receiving, by a rebate marketplace aggregator system comprising one or more computers and via one or more networks, an offer for an available rebate arrangement associated with one or more pharmaceutical products of a drug manufacturer, wherein one or more conditions are associated with the rebate arrangement;
presenting, by the rebate marketplace aggregator system via the one or more networks, information associated with the offer to a payer of pharmaceutical benefits;
receiving, by the rebate marketplace aggregator system via the one or more networks, an indication of acceptance of the offer by the payer;
facilitating, by the rebate marketplace aggregator system, the enrollment of the payer in the rebate arrangement based at least in part on the received indication of acceptance;
collecting, by the rebate marketplace aggregator system subsequent to the enrollment of the payer in the rebate arrangement, claim transaction information associated with one or more pharmaceutical claims made for services provided by the payer to its customers;
comparing, by the rebate marketplace aggregator system, at least a portion of the collected claim transaction information to the one or more conditions associated with the rebate arrangement; and
determining, by the rebate marketplace aggregator system based at least in part on the comparison, whether the one or more conditions associated with the rebate arrangement have been satisfied.

16. The method of claim 15, further comprising:
receiving, by the rebate marketplace aggregator system via the one or more networks, an acceptance of the one or more conditions by the payer.

17. The method of claim 15, wherein the one or more conditions comprise one or more of a condition associated with listing a pharmaceutical product as a preferred pharmaceutical product, a limitation on a number of pharmaceutical products that may be offered by the payer as preferred pharmaceutical products within a therapeutic class, or a condition associated with a co-payment differential between a preferred pharmaceutical product and one or more non-preferred pharmaceutical products.

18. The method of claim 15, wherein collecting claim transaction information associated with one or more pharmaceutical claims made for services provided by the payer to its customers comprises collecting claim transaction information in real time or near real time as the one or more pharmaceutical claims are routed between the payer and a point of sale device.

19. The method of claim 15, further comprising:
generating, by the by the rebate marketplace aggregator system, one or more reports based at least in part on the determination of whether the one or more conditions associated with the rebate arrangement have been satisfied; and
communicating, by the by the rebate marketplace aggregator system, the one or more generated reports to at least one of the drug manufacturer or the payer.

20. The method of claim 15, wherein receiving an offer for an available rebate arrangement associated with one or more pharmaceutical products of a drug manufacturer comprises receiving a plurality of offers for a plurality of available rebate arrangements, and further comprising:
receiving, by the rebate market aggregator system from the payer, a selection of one of the plurality of offers,
wherein facilitating the enrollment of the payer in the rebate arrangement comprises facilitating the enrollment of the payer in the selected one of the plurality of offers.

* * * * *

UNITED STATES PATENT AND TRADEMARK OFFICE
CERTIFICATE OF CORRECTION

PATENT NO. : 8,635,083 B1
APPLICATION NO. : 12/242317
DATED : January 21, 2014
INVENTOR(S) : Casu Page 1 of 1

It is certified that error appears in the above-identified patent and that said Letters Patent is hereby corrected as shown below:

In the Claims

Column 25, line 39, claim 1, please change "at least in put" to -- at least in part --

Column 28, line 44, claim 19, please change "by the by the rebate" to -- by the rebate --

Column 28, line 49, claim 19, please change "by the by the rebate" to -- by the rebate --

Signed and Sealed this
Sixth Day of May, 2014

Michelle K. Lee
*Deputy Director of the United States Patent and Trademark Office*